United States Patent
Yau et al.

(10) Patent No.: US 11,694,723 B2
(45) Date of Patent: Jul. 4, 2023

(54) REMOVING VISUAL CONTENT REPRESENTING A REFLECTION OF A SCREEN

(71) Applicants: Samuel Chi Hong Yau, Burlingame, CA (US); Daisy S. Yau, Burlingame, CA (US)

(72) Inventors: Samuel Chi Hong Yau, Burlingame, CA (US); Daisy S. Yau, Burlingame, CA (US)

(*) Notice: Subject to any disclaimer, the term of this patent is extended or adjusted under 35 U.S.C. 154(b) by 26 days.

(21) Appl. No.: 17/333,577

(22) Filed: May 28, 2021

(65) Prior Publication Data
US 2021/0390983 A1 Dec. 16, 2021

Related U.S. Application Data

(60) Provisional application No. 63/039,855, filed on Jun. 16, 2020.

(51) Int. Cl.
*G11B 27/02* (2006.01)
*H04N 5/262* (2006.01)
*G06V 20/40* (2022.01)

(52) U.S. Cl.
CPC ............. *G11B 27/02* (2013.01); *G06V 20/46* (2022.01); *H04N 5/2621* (2013.01)

(58) Field of Classification Search
CPC .... G11B 27/02; G06V 20/46; G06K 9/00744; H04N 5/2621; H04N 5/144; H04N 5/147; H04N 19/142; H04N 21/44; H04N 21/47217
USPC .......................................................... 386/241
See application file for complete search history.

(56) References Cited

U.S. PATENT DOCUMENTS

| | | | |
|---|---|---|---|
| 10,785,421 B2 | 9/2020 | Denoue et al. | |
| 10,825,157 B2 | 11/2020 | Moussa | |
| 2008/0284768 A1* | 11/2008 | Yoshida | G09G 3/2022 345/208 |
| 2015/0242680 A1* | 8/2015 | Thukral | A61B 3/113 348/78 |
| 2019/0102872 A1* | 4/2019 | Moussa | G06T 5/50 |

* cited by examiner

*Primary Examiner* — Thai Q Tran
*Assistant Examiner* — Nienru Yang

(57) ABSTRACT

A screen is manipulated to display content whose reflection is not captured by a sensor. In an embodiment, the screen inserts a black frame between screen content frames, displaying the black frame during a particular time. A sensor captures a video frame during the particular time. The video frame does not include a screen reflection and is considered a clean frame. In another embodiment, the screen displays screen content with a particular polarization during a particular time. A sensor captures a video frame with another polarization during the same time. The polarizations are selected such that the sensor is unable to capture screen reflections. The video frame is considered a clean frame. The clean frame is used to generate a masking frame, which is applied to target video frames to remove screen reflection. A modified target video, including the reflection-removed target video frame, and/or the clean frame itself, is generated.

20 Claims, 13 Drawing Sheets

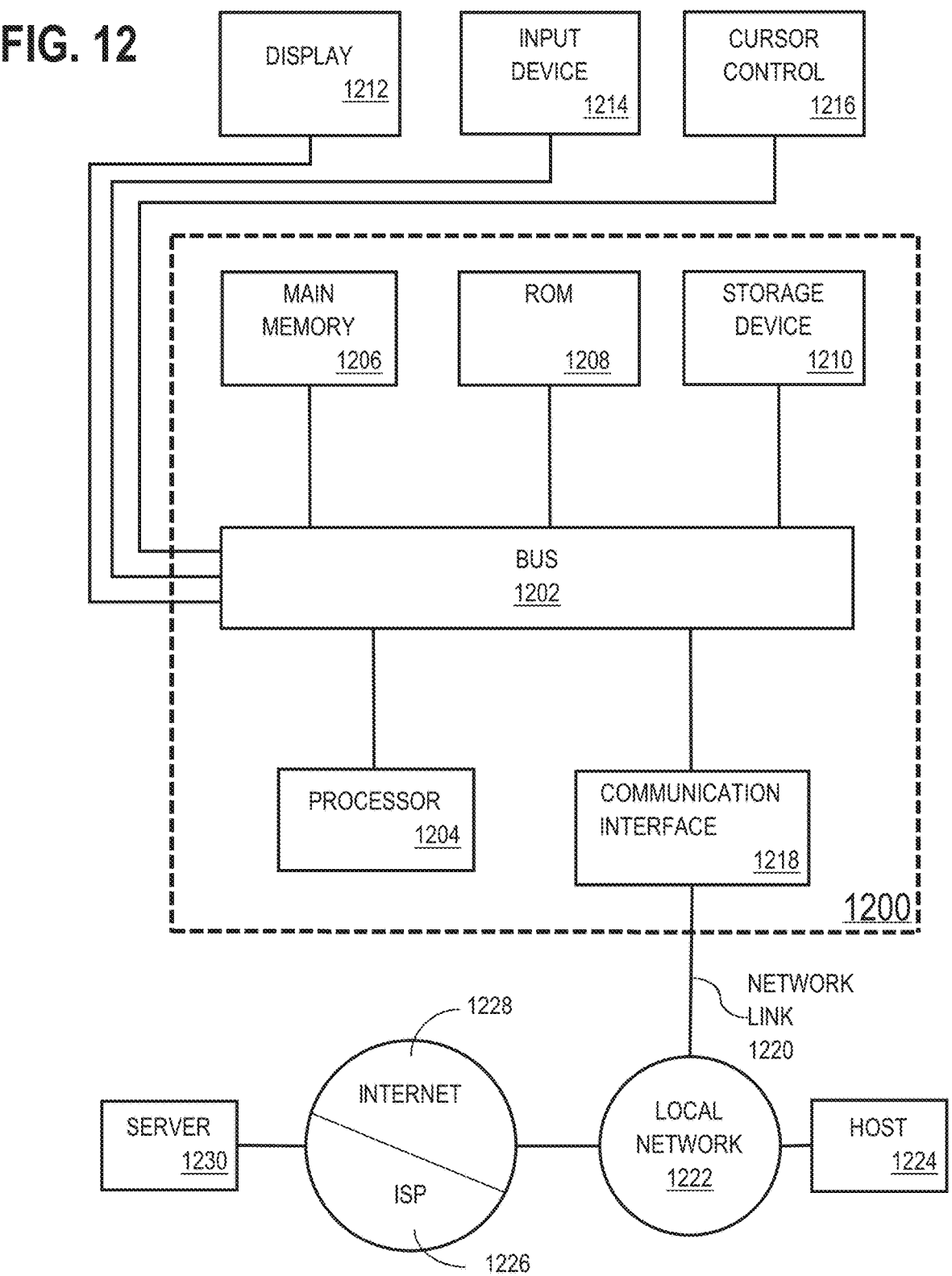

REMOVING VISUAL CONTENT REPRESENTING A REFLECTION OF A SCREEN

INCORPORATION BY REFERENCE; DISCLAIMER

This application is hereby incorporated by reference: application No. 63/039,855 filed on Jun. 16, 2020. The Applicant hereby rescinds any disclaimer of claim scope in the parent application or the prosecution history thereof and advises the USPTO that the claims in this application may be broader than any claim in the parent application.

TECHNICAL FIELD

The present disclosure relates to image processing and/or video processing. In particular, the present disclosure relates to removing visual content representing a reflection of a screen.

BACKGROUND

Video recording, video playing, video streaming, video conference, and other activities relating to videos are becoming increasingly popular. In some cases, a video is captured with, or otherwise includes, visual content that is not germane to a user's main usage of the video. This includes, for example, reflections of objects that would be out of view of the camera or optical sensor but for the reflection.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 12 shows a block diagram that illustrates a computer system in accordance with one or more embodiments.

DETAILED DESCRIPTION

Figure 1:
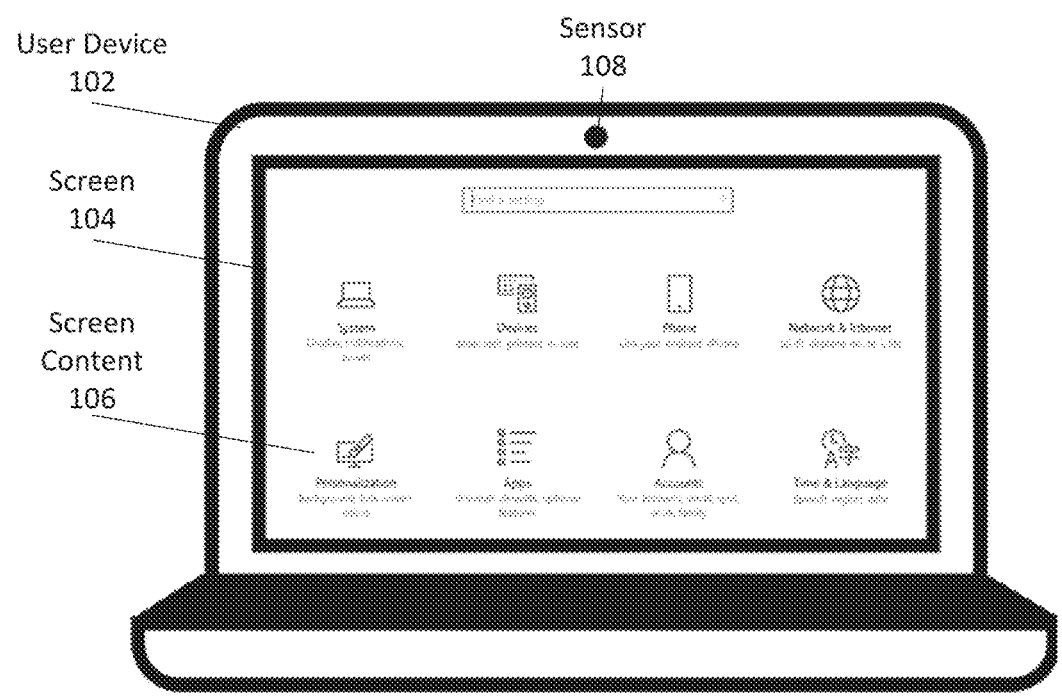
FIG. 1 illustrates an example user device configured to capture a target video, in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. REFLECTION REMOVAL SYSTEM ARCHITECTURE
3. REMOVING VISUAL CONTENT REPRESENTING A SCREEN REFLECTION OF SCREEN CONTENT
4. REMOVING VISUAL CONTENT REPRESENTING A SCREEN REFLECTION BY APPLYING A MASKING FRAME
5. REMOVING VISUAL CONTENT REPRESENTING A SCREEN REFLECTION BY GENERATING REPLACEMENT VISUAL CONTENT
6. REMOVING VISUAL CONTENT REPRESENTING A SCREEN REFLECTION BY REMOVING TAINTED VIDEO FRAMES
7. REMOVING VISUAL CONTENT REPRESENTING A SCREEN REFLECTION BY MANIPULATING POLARIZATION
8. COMPUTER NETWORKS AND CLOUD NETWORKS
9. HARDWARE OVERVIEW
10. MISCELLANEOUS; EXTENSIONS

1. General Overview

One or more embodiments include removing visual content, from a target video, that represents a reflection of display content on a screen. Display content on a screen may also be referred to herein as "screen content." A sensor captures successive images, which is converted into data representing a target video. One or more of the successive images include visual content that represents a reflection of screen content. The reflection of screen content may appear on, for example, a lens of a pair of eyeglasses worn by a user facing the screen. The reflection may be an annoyance to a viewer of the target video. Additionally or alternatively, the reflection may reveal screen content that an author of the target video did not intend to disclose. Hence, a reflection removal function is applied to the target video to generate a modified video. The reflection removal function removes the visual content representing the reflection of screen content. The reflection removal function does not necessarily remove any visual content not representing a reflection of screen content. Therefore, the modified target video does not include the visual content representing the reflection of screen content, but still includes surrounding visual content.

In an embodiment, reflection removal is performed by using a transform function that maps screen content to a view of a reflection of the screen content from the perspective of a sensor capturing a target video. A transform function is applied to the screen content to generate a masking frame. The masking frame is applied to a video frame of the target video. The modified video frame therefore shows an image that would be captured by the sensor if there were no reflection of the screen content. As an example, a reflection of screen content may appear on a lens of a pair of eyeglasses worn by a user facing a screen. What would be captured by a sensor if there were no reflection of the screen content would be the transparent lens of the eyeglasses, through which the skin surrounding the user's eyes would be seen. By applying a masking frame to a target video captured by the sensor, the modified target video would show visual content, within the frame of the eyeglasses, representing the skin surrounding the user's eyes. In an embodiment, the transform function is generated using machine learning.

In an embodiment, reflection removal is performed by altering a rate at which screen content is displayed, such that a sensor captures at least one video frame without any reflection of screen content. The rate of displaying screen content is adjusted such that no screen content is displayed on the screen at a particular moment. A particular video frame is captured by the sensor while no screen content is displayed at the particular moment. Hence, the particular video frame is known not to include any reflection of screen content. The particular video frame is subtracted from another video frame known to include a reflection of at least a portion of the screen content to generate a masking frame. The masking frame is applied to the next video frame known to include a reflection of at least a portion of the screen content to remove the reflection.

In an embodiment, reflection removal is performed by detecting visual content representing a reflection of screen content within a target video and determining suitable replacement visual content. A reflection of screen content is detected based on what is known about the screen content. As an example, a system may be aware of attributes of the screen content, such as the colors presented in the screen content; the size, shape, and locations of borders presented in the screen content; and/or the dimensions, and aspect ratio of the screen content. If visual content within a target video matches with the attributes of the screen content, then the visual content may be determined as representing a reflection of the screen content. Additionally or alternatively, a reflection of screen content is detected based on what is known about the target video. As an example, a system may determine that a certain location within a target video corresponds to an eye of a user. The system may detect nearby visual content that does not match with expected visual content surrounding an eye. The unexpected visual content may be determined as representing a reflection of screen content.

Moreover, suitable replacement visual content is determined based on visual content corresponding to the location of a reflection of screen content within a current video frame that is captured in one or more other video frames. The other video frames may be referred to as "reference video frames." The system may obtain a reference video frame from a past video frame in the target video. Additionally or alternatively, the system may obtain a reference video frame from another video, which may be referred to herein as a "reference video." Different sensors may be used to capture the target video and the reference video. The system transposes a location of the reflection of the screen content in the current video frame to a particular location within the reference video frame. The system identifies visual content corresponding to the particular location within the reference video frame. If the identified visual content does not represent a reflection of the screen content, then the identified visual content is used to generate replacement visual content.

One or more embodiments described in this Specification and/or recited in the claims may not be included in this General Overview section.

2. Reflection Removal System Architecture

FIG. 1 illustrates an example user device configured to capture a target video, in accordance with one or more embodiments. As illustrated, a user device 102 may include a screen 104 and a sensor 108. A user device 102 may be configured to record a video, which is stored in local storage, remote storage, and/or cloud storage. Additionally or alternatively, a user device 102 may be configured to stream live video, which is shared to other user device through a direct connection and/or through a central server. The user device 102 may be used, for example, to conduct video conferencing. In some embodiments, one or more sensors 108 may be used. One or more sensors 108 may be but are not necessarily attached and/or implemented on the user device 102. One or more sensors 108 may be communicatively coupled to the user device 102.

In one or more embodiments, a screen 104 is a piece of hardware that displays visual information to serve as an interface between a user device 102 and a user. In an embodiment, a screen 104 is a physical surface, which may be made of glass or another material. In an embodiment, a screen 104 may be a projector screen, wall, or other physical surface that reflects an image projected by a projector.

In one or more embodiments, screen content 106 refers to display content shown on a screen 104. Screen content 106 serves as a user interface between a user device 102 and a user. Screen content 106 includes any display content on a screen, such as hue, brightness, sharpness, text, photographs, images, icons, windows, checkboxes, radio buttons, drop-down lists, list boxes, buttons, toggles, text fields, date and time selectors, command lines, sliders, pages, forms, and/or other user interface elements.

In one or more embodiments, a sensor 108 is a piece of hardware that captures one or more images. Successive images may be compiled to form a video.

Figure 2:
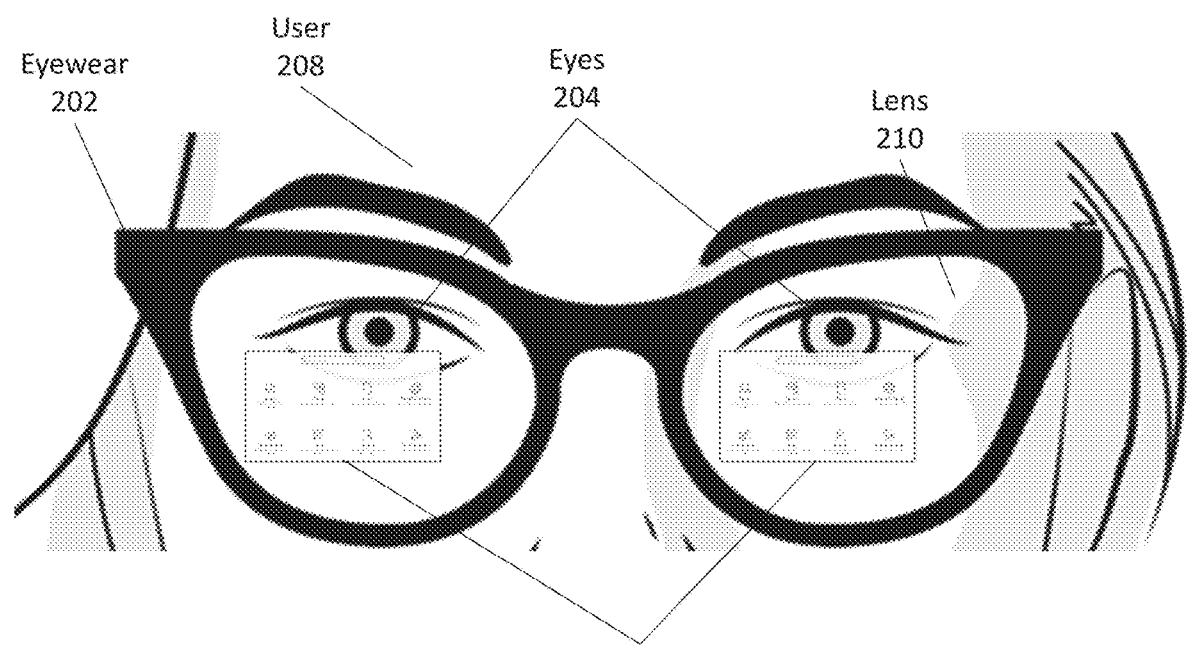
FIG. 2 illustrates a reflection of a display content on a screen, in accordance with one or more embodiments.

FIG. 2 illustrates a reflection of display content on a screen, in accordance with one or more embodiments. A user 208 may face a user device (such as the user device 102 of FIG. 1) to create a target video. As illustrated, the user 208 wears an eyewear 202 which includes lens 210. The lens 210 are transparent and reflective. Through the lens 210, the eyes 204 of the user 208 are visible. Additionally, reflections 206 of screen content appear on the lens 210. The reflections 206 may be disruptive to a viewer of the target video. Additionally or alternatively, the reflections 206 may reveal screen content that the user 208 did not intend to include in the target video.

Figure 3A:
FIGS. 3A-C illustrate example systems for recording, storing, transmitting, and/or displaying a video, in accordance with one or more embodiments.
Figure 3B:
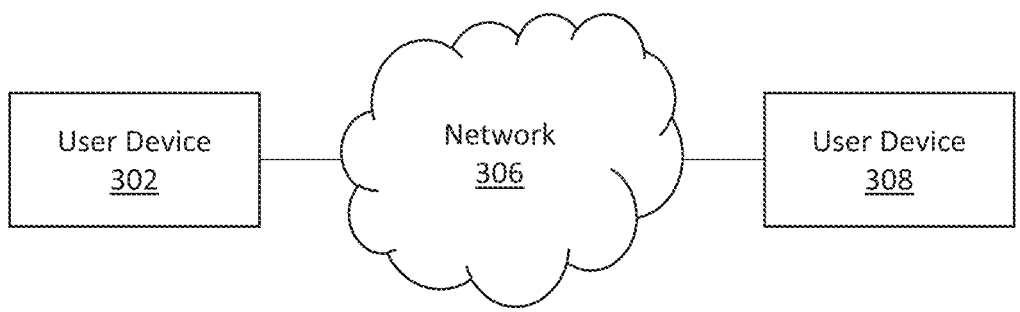
Figure 3C:
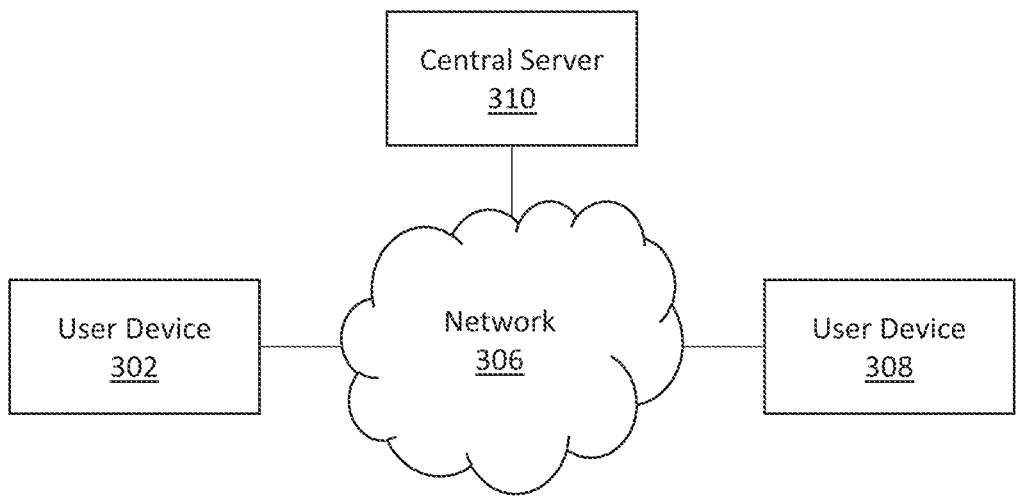

FIGS. 3A-C illustrate example systems for recording, storing, transmitting, and/or displaying a video, in accordance with one or more embodiments.

In FIG. 3A, a user device 302 is configured to record a target video and store the target video (and/or a modified target video) in a data repository 304. The user device 302 includes hardware and/or software configured to perform operations described herein for removing visual content, from a target video, representing a reflection of screen content.

The data repository 304 is any type of storage unit and/or device (e.g., a file system, database, collection of tables, or any other storage mechanism) for storing data. The data repository 304 may include multiple different storage units and/or devices. The multiple different storage units and/or devices may or may not be of the same type or located at the same physical site. Further, the data repository 304 may be implemented or executed on the same computing system as the user device 302. Alternatively or additionally, the data repository 304 may be implemented or executed on a computing system separate from the user device 302. The data repository 304 may be communicatively coupled to the user device 302 via a direct connection or via a network.

In FIG. 3B, a user device 302 is configured to record a target video and transmit, via a direct connection or via a network 306, the target video (and/or a modified target video) to another user device 308. The user device 302 may stream the target video (and/or a modified target video) to the user device 308. Additionally or alternatively, the user device 302 may transmit the target video (and/or a modified target video) to the user device 308 as part of a video conference.

The user device 302 and/or the user device 308 includes hardware and/or software configured to perform operations described herein for removing visual content, from a target video, representing a reflection of screen content. In an embodiment, the user device 302 removes visual content, from a target video, representing a reflection of screen content, and transmits the modified target video the user device 308. The user device 308 is not necessarily aware that the video being received has been thus modified. In another embodiment, the user device 302 transmits the target video to the user device 308. The user device 308 then removes visual content, from a target video, representing a reflection of screen content. In another embodiment, the user device 302 detects visual content, in a target video, representing a reflection of screen content. The user device 302 transmits to the user device 308 (a) the target video, (b) information identifying the visual content representing the reflection of screen content, and (c) replacement visual content. The user device 308 compiles the received information to replace the visual content representing the reflection of screen content with the replacement visual content.

In FIG. 3C, a user device 302 is configured to record a target video and transmit, via a central server 310, the target video (and/or a modified target video) to another user device 308. The user device 302 transmits the target video (and/or a modified target video) to the central server 310. The central server 310 may perform video processing on the video. The central server 310 then transmits the target video (and/or a modified target video) to the user device 308. The central server 310 may be a server within a cloud network. Additional embodiments and/or examples relating to cloud networks are described below in Section 6, titled "Computer Networks and Cloud Networks."

The user device 302, the central server 310, and/or the user device 308 includes hardware and/or software configured to perform operations described herein for removing visual content, from a target video, representing a reflection of screen content. The central server 310 may be configured to perform any of the operations described above as being performed by the user device 302 and/or the user device 308 with reference to FIGS. 3A-B.

In one or more embodiments, a reflection removal module is implemented on one or more digital devices, such as the user device 302, the user device 308, and/or the central server 310 of FIGS. 3A-C. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a mainframe, a television, a content receiver, a set-top box, a printer, a mobile handset, a smartphone, and/or a personal digital assistant (PDA).

In one or more embodiments, a reflection removal module may rely on a machine learning algorithm. A machine learning algorithm is an algorithm that can be iterated to learn a target model f that best maps a set of input variables to an output variable. In particular, a machine learning algorithm 114 is configured to generate and/or train a transform function that maps screen content to a view of a reflection of the screen content from the perspective of a sensor used for generating a target video. The transform function is used to remove a reflection of screen content from the target video. The modified target video is checked to determine if the reflection remains and/or to determine the attributes of the reflection that remains. Based on the attributes of the reflection that remains in the modified target video, the transform function is updated to better remove the reflection of screen content from the target video.

3. Removing Visual Content Representing a Reflection of Screen Content

Figure 4:
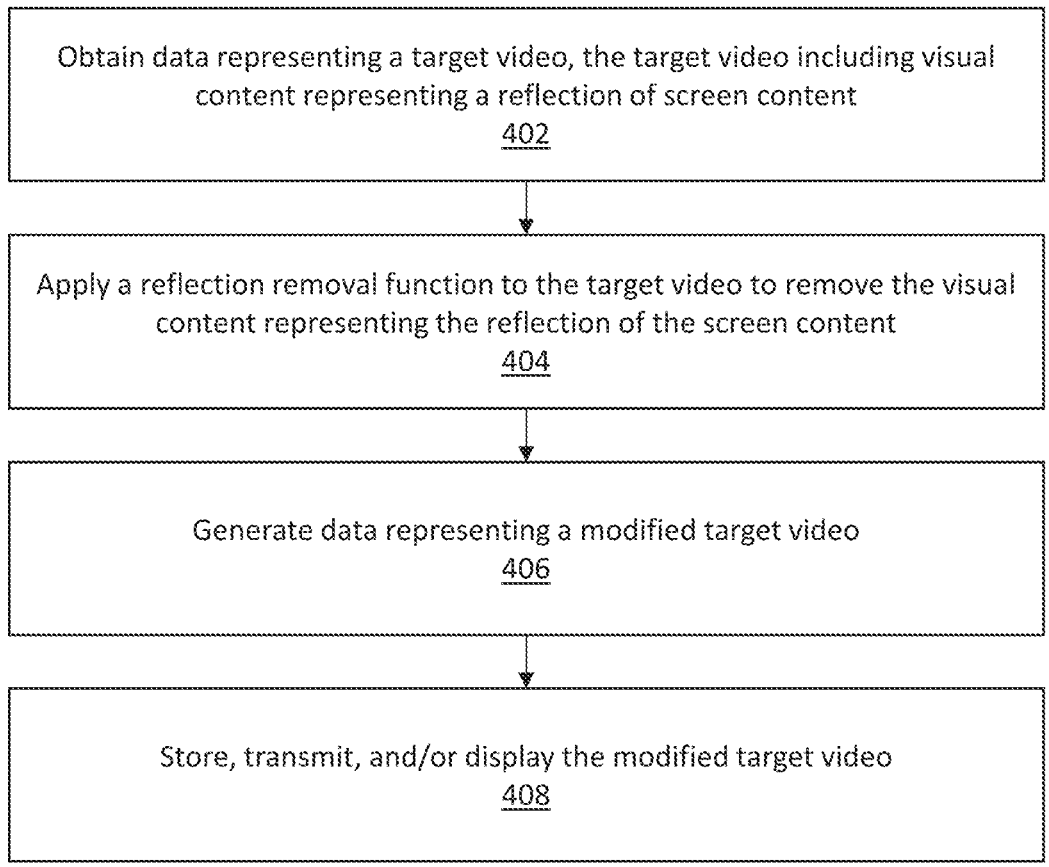
FIG. 4 illustrates an example set of operations for removing, from a video, visual content representing a reflection of display content on a screen, in accordance with one or more embodiments.

One or more operations illustrated in FIG. 4 may be modified, rearranged, or omitted all together. Accordingly, the particular sequence of operations illustrated in FIG. 4 should not be construed as limiting the scope of one or more embodiments. Operations of FIG. 4 may be executed by a source user device (such as user device 102 of FIG. 1, or user device 302 of FIGS. 3A-3C), a recipient user device (such as user device 308 of FIGS. 3B-3C), a central server (such as central server 310 of FIG. 3C), and/or any other application communicatively coupled to the source user device. For purposes of clarify, the operations are described below as being performed by a user device, which may refer to a source user device and/or a recipient user device.

FIG. 4 illustrates an example set of operations for removing, from a video, visual content representing a reflection of display content on a screen, in accordance with one or more embodiments.

One or more embodiments include obtaining data representing a target video, the target video including visual content representing a reflection of display content on a screen (Operation 402). A sensor (such as sensor 108 of FIG. 1) captures frames of a target video. Multiple frames together constitute the target video. The target video includes a reflection of display content on a screen. A user device obtains the target video from the sensor.

One or more embodiments include applying a reflection removal function to the target video to remove the visual content representing the reflection of the screen content displayed by the screen (Operation 404). The user device applies a reflection removal function to the target video. The reflection removal function removes the visual content representing the reflection of the screen content. The reflection removal function does not necessarily remove any visual content that does not represent any reflection of any screen content. Various implementations of the reflection removal function may be used. Examples of reflectional removal functions are described below with reference to FIGS. 5-8.

One or more embodiments include generating data representing a modified target video (Operation 406). The user device generates data representing a modified target video. The modified target video does not include the visual content representing the reflection of the screen content, which has been removed by the reflection removal function; however the modified target video still includes surrounding visual content.

One or more embodiments include storing, transmitting, and/or displaying the modified target video (Operation 408). The user device stores, transmits, and/or displays the modified target video. Hence, the reflection of the screen content is not perceptible to a human being viewing the modified target video.

4. Removing Visual Content Representing a Screen Reflection by Applying a Masking Frame One or more operations illustrated in FIGS. 5-6 may be modified, rearranged, or omitted all together. Accordingly, the particular sequence of operations illustrated in FIGS. 5-6 should not be construed as limiting the scope of one or more embodiments. Operations of FIGS. 5-6 may be executed by a source user device (such as user device 102 of FIG. 1, or user device 302 of FIGS. 3A-3C), a recipient user device (such as user device 308 of FIGS. 3B-3C), a central server (such as central server 310 of FIG. 3C), and/or any other application communicatively coupled to the source user device. For purposes of clarify, the operations are described below as being performed by a user device, which may refer to a source user device and/or a recipient user device.

Figure 5A:
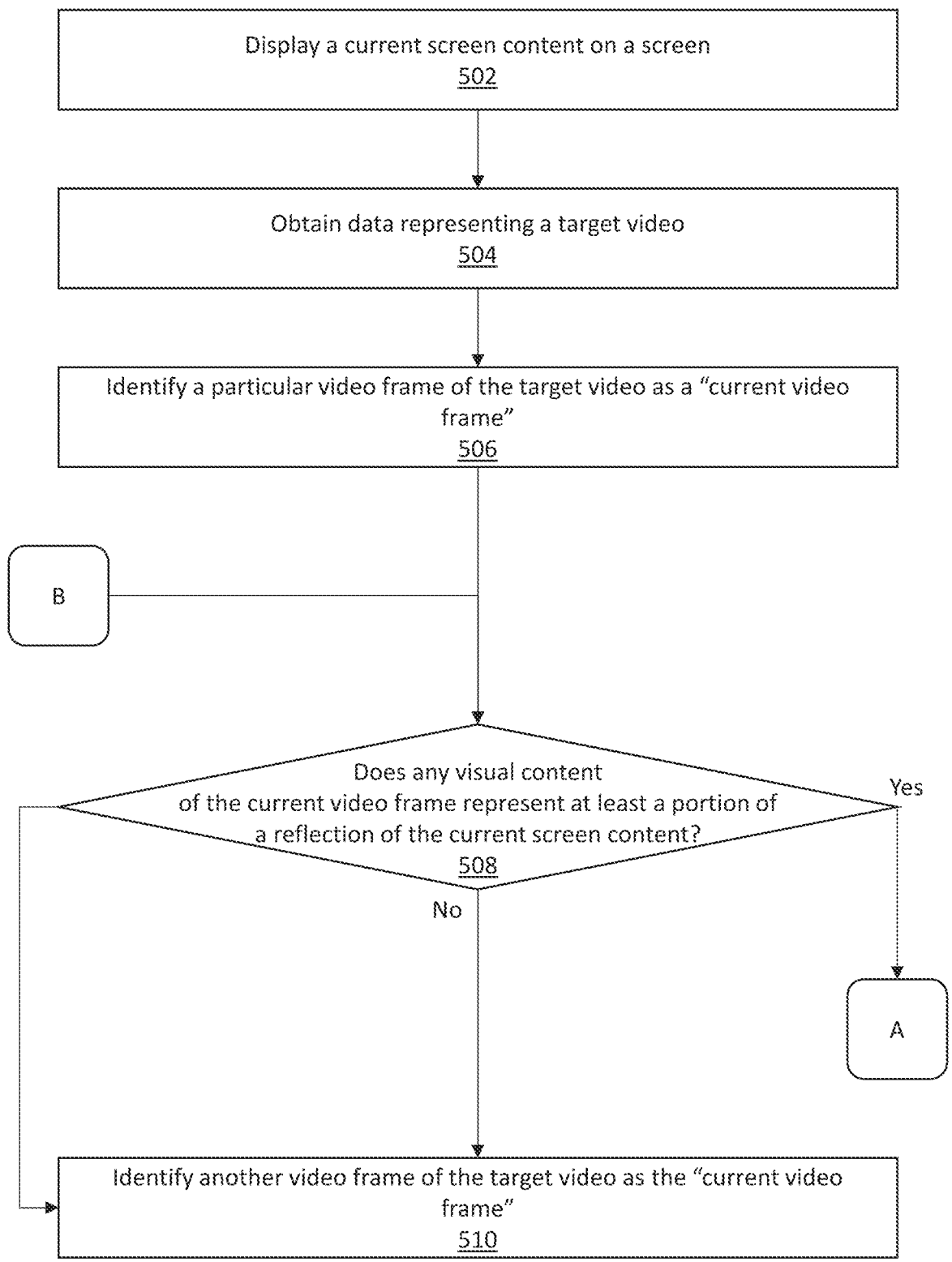
FIGS. 5A-5B illustrates an example set of operations for removing, from a video, visual content representing a reflection of display content on a screen, by applying a transform function to the display content on the screen to generate a masking frame, in accordance with one or more embodiments.
Figure 5B:
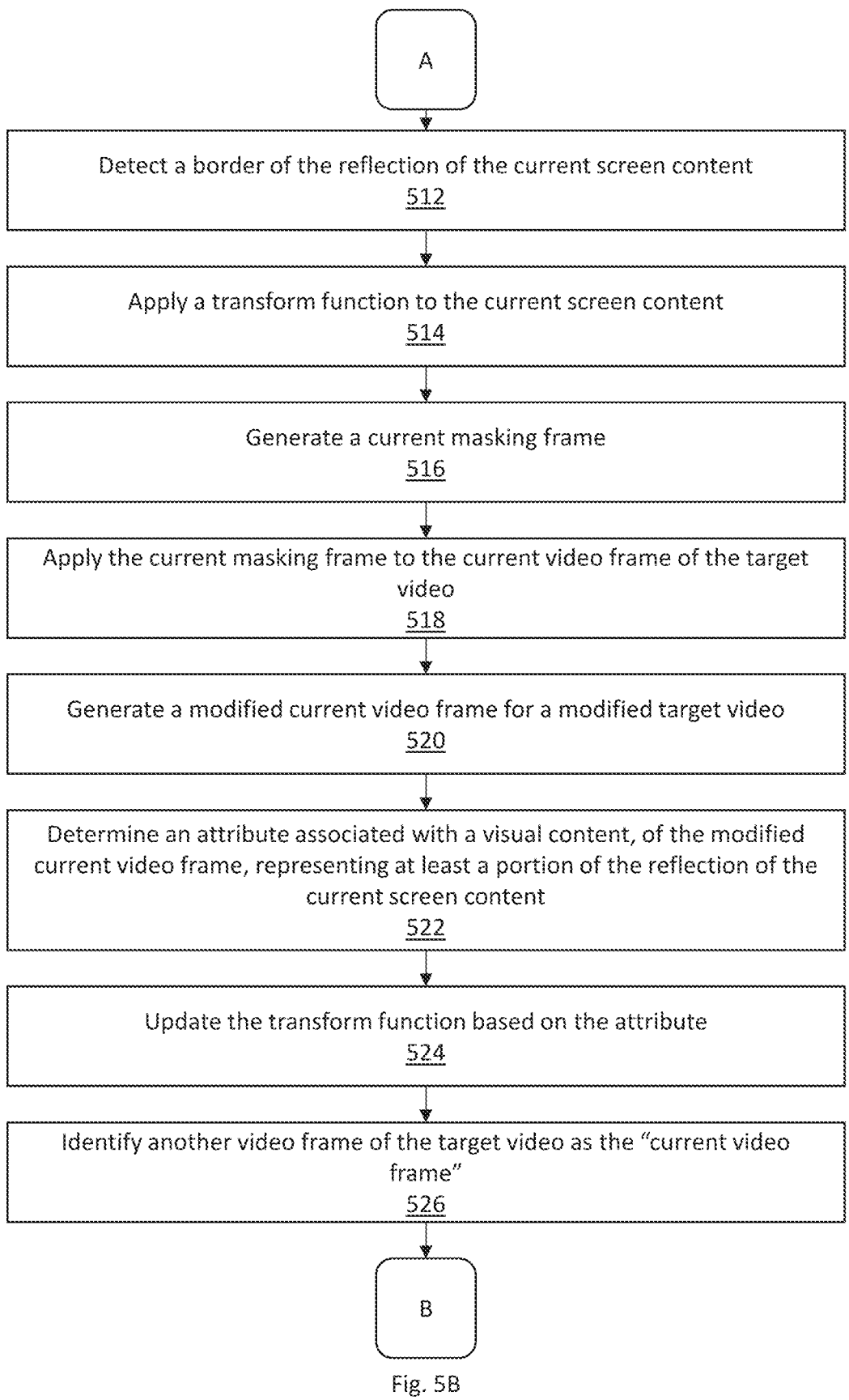

FIGS. 5A-5B illustrates an example set of operations for removing, from a video, visual content representing a reflection of display content on a screen, by applying a transform function to the display content on the screen, in accordance with one or more embodiments.

One or more embodiments include displaying a current screen content on a screen (Operation 502). A screen (such as screen 104 of FIG. 1) of a user device displays a current screen content. Optionally, the current screen content may be displayed with visual anchors. The anchors may aid in developing, learning, training, designing, and/or otherwise determining a transform function, as further described below. The anchors may be imperceptible to a human being.

One or more embodiments include obtaining data representing a target video (Operation 504). The user device obtains data representing a target video, which was captured by a sensor (such as sensor 108 of FIG. 1).

One or more embodiments include identifying a particular video frame of the target video as a "current video frame" (Operation 506). The user device iterates through video frames of the target video to process the video frames. The user device identifies a particular video frame of the target video as a "current video frame."

One or more embodiments include determining whether any visual content of the current video frame represents at least a portion of a reflection of the current screen content (Operation 508). Various approaches for determining whether any visual content of the current video frame represents at least a portion of a reflection of the current screen content may be used.

In an embodiment, visual content within the current video frame is compared with the current screen content. If there is a match between the visual content within the current video frame and the current screen content, then the visual content is determined as representing at least a portion of a reflection of the current screen content. As an example, a current screen content may include certain windows and certain icons. Borders within the current video frame may be determined. Whether the shape of a border within the current video frame matches the shape of a borders of a window or icon of the current screen content may be determined. If a match is found, then the visual content within and/or surrounding the matching border is determined as representing a reflection of the current screen content. As another example, a current screen content may include anchors purposefully generated for detection during reflection removal. If anchors are found, then the visual content is determined as representing a reflection of the current screen content.

In an embodiment, whether any unexpected visual content appears within the current video frame is determined. As an example, an area within a current video frame corresponding to a location of an eye and/or eyewear may be identified. Visual content within a threshold distance from the identified area may be analyzed. Expected visual content surrounding an eye or eyewear may be determined. If any visual content for analysis does not match the expected visual content surrounding an eye or eyewear, then the visual content is determined as representing a current screen content.

In an embodiment, whether any visual content of the current video frame represents at least a portion of a reflection of the current screen content is determined by searching and/or analyzing only a portion of the current video frame. An area within the current video frame corresponding to a location of an eye and/or eyewear is identified. An analysis area within a threshold distance from the identified area is determined. The analysis area is searched and/or analyzed for any visual content representing a reflection of the current screen content; the remainder of the current video frame is not searched and/or analyzed for any visual content representing a reflection of the current screen content.

If no visual content of the current video frame represents a reflection of the current screen content, then one or more embodiments include identifying another video frame of the target video as the "current video frame" (Operation 510). The process reiterates with respect to the new current video frame.

If some visual content of the current video frame represents a reflection of the current screen content, then one or more embodiments include detecting a border of the reflection of the current screen content (Operation 512). The border of the reflection of the current screen content, in the current video frame, is initially assumed to be of a regular shape, such as a rectangle, a trapezoid, and/or a parallelogram. The area within the shape may be referred to as the "assumed area."

Visual content within the assumed area is analyzed to determine if any portion does not actually represent a reflection of the current screen content. In an embodiment, the current screen content includes visual anchors as described above. Determining whether visual content within the assumed area actually represents reflection of the current screen content includes determining whether the assumed area includes the expected visual anchors. A border of the reflection of the current screen content is determined between (a) visual content within the assumed area that actually represents a reflection of the current screen content and (b) visual content within the assumed area that does not actually represent a reflection of the current screen content.

Additionally and/or alternatively, visual content within the assumed area is analyzed to determine if any portion represents a well-defined border. A well-defined border may be, for example, a frame of the lens of a pair of eyeglasses. The well-defined border may be determined as a border of the reflection of the current screen content. In an embodiment, if visual content representing a reflection of the current screen content is found on only one side of the well-defined border but not on the other side of the well-defined border, then the well-defined border is determined as a border of the reflection of the current screen content.

One or more embodiments include applying a transform function to the current screen content (Operation 514). A perfectly-designed transform function would map the screen content to a view of a "clean reflection" of the screen content from the perspective of a sensor used to capture the target video. A "clean reflection" refers to a reflection of the screen content that would reflect off of a perfect mirror. The perfectly-designed transform function may be determined via machine learning and/or human user input.

The transform function includes various components, such as a hue component, a brightness component, a scaling component, a tilt component, a reflection component, and/or other components. Each component defines how a respective attribute of the screen content is to be transformed. Each component may be given as a single number, a vector, an array, a matrix, and/or a combination thereof. The hue component defines how the hue of each pixel or unit of the current video frame is changed in the reflection. The brightness component defines how the brightness of each pixel or unit of the current video frame is changed on the reflection. The scaling component defines the dimensions of the reflection with respect to the dimensions of the screen content. The tilt component defines how the reflection is tilted in three-dimensional space compared with the screen content. The reflection component defines how the reflection is horizontally flipped compared with the screen content.

Initially, an initial transform function may be bootstrapped to include an initial scaling component determined based on the current video frame. As an example, an initial scaling component may be determined based on the dimensions of the border of the reflection of the current screen content detected at Operation 512 and the dimensions of the screen. As another example, an initial scaling component may be determined based on the dimensions of a user interface element shown in the reflection of the current screen content and the dimensions of the user interface element in the current screen content. As another example, an initial scaling component may be determined based on distances between user interface elements and/or visual anchors shown in the reflection of the current screen content and distances between the user interface elements and/or visual anchors in the current screen content. As another example, a combination of the above examples may be used.

Additionally or alternatively, the initial transform function may include a hue component and/or a brightness component that merely generally lowers the overall brightness level within an area assumed to correspond to a reflection of the current screen content. Other types of initialization and/or bootstrapping may also be used.

Optionally, the transform function is only applied to the portion of current video frame within the border of the reflection of the current screen content detected at Operation 512.

One or more embodiments include generating a current masking frame (Operation 516). Based on the perfectly-designed transform function, a current masking frame shows the clean reflection of the screen, from the perspective of the sensor used to capture the target video. The current masking frame would be blank, other than the portion showing the clean reflection of the screen.

One or more embodiments include applying the current masking frame to the current video frame of the target video (Operation 518). Applying the current masking frame to the current video frame includes subtracting the current masking frame from the current video frame. As an example, each pixel of the current video frame includes a respective red, green, blue (RGB) brightness level. The red brightness level of a pixel in the current masking frame is subtracted from the red brightness level of the corresponding pixel in the current video frame. The green brightness level of a pixel in the current masking frame is subtracted from the green brightness level of the corresponding pixel in the current video frame. The blue brightness level of a pixel in the current masking frame is subtracted from the blue brightness level of the corresponding pixel in the current video frame.

Optionally, applying the current masking frame to the current video frame further includes adjusting the overall brightness level of each pixel that has been modified. An initial overall brightness level of a particular pixel in the current video frame is determined. After subtracting the RGB brightness levels of the corresponding pixel in the current masking frame from the particular pixel in the current video frame, the particular pixel has an intermediate overall brightness level. The intermediate overall brightness level may be slightly darker than what should naturally appear without any reflection of screen content. The intermediate overall brightness level is adjusted to be same, or similar, to the initial overall brightness level. The final overall brightness level is between the intermediate overall brightness level and the initial overall brightness level.

One or more embodiments include generating a modified current video frame for a modified target video (Operation 520). After the current masking frame is applied to the current video frame, a modified current video frame is generated.

One or more embodiments include determining an attribute associated with a visual content, of the modified current video frame, representing at least a portion of the reflection of the current screen content (Operation 522).

Whether the modified current video frame includes visual content representing at least a portion of the reflection of the current screen content is determined. Examples of operations for determining whether any visual content represents a reflection of screen content is described above with reference to Operation 508. Attributes of any visual content representing at least a portion of the reflection of the current screen content are determined. Attributes of the visual content representing a screen reflection may include RGB brightness levels, distances between icons or anchors or corners, and angles or tilts of borders.

As an example, an area of a modified current video frame that corresponds to a location of a user's eye may be determined. Visual content not matching with the expected visual content surrounding an eye may be identified. The unexpected visual content may be determined as visual content representing at least a portion of a reflection of current screen content. The RGB brightness levels of the unexpected visual content may be determined. The RGB brightness levels constitute attributes associated with visual content representing at least a portion of the reflection of the current screen content.

As an example, current screen content may include visual anchors. Whether visual content within a modified current video frame represents any visual anchors may be determined. Distances between the visual anchors in the modified current video frame may be determined. The distances between the visual anchors in the modified current video frame constitute attributes associated with visual content representing at least a portion of the reflection of the current screen content.

One or more embodiments include updating the transform function based on the attribute (Operation 524). The transform function is updated such that the next masking frame would be adjusted based on the attribute of the visual content representing the reflection of the current screen content determined at Operation 522.

As an example, a modified current video frame may include visual content representing at least a portion of a reflection of current screen content. Attributes of such visual content may be determined as being a red brightness level of 200, a green brightness level of 100, and a blue brightness level of 20.

A user device may estimate a corrected visual content based on visual content in the modified current video frame surrounding the visual content representing the screen reflection. The user device may estimate determine average RGB brightness levels of the surrounding visual content. The surrounding visual content may have a red brightness level of 150, a green brightness level of 90, and a blue brightness level of 15.

The user device may update the transform function to include greater adjustments for RGB brightness levels. The transform function may include a brightness component that further lower the red brightness level by 50, the green brightness level by 10, and the blue brightness level by 5, within the area where the portion of the current screen content remains in the modified current video frame. The user device may generate an updated masking frame based on the updated transform function, for application to a next video frame of the target video.

As another example, a modified current video frame may include visual content representing at least a portion of a reflection of current screen content. Attributes of such visual content may be determined as visible edges of visual anchors. The visible edges of the visual anchors may indicate that a width of the "clean reflection" produced by a transform function is smaller than a width of the visual content within a target video representing a screen reflection.

A user device may adjust the scaling component of the transform function to generate a wider "clean reflection." The user device may generate an updated masking frame based on the updated transform function, for application to a next video frame of the target video.

One or more embodiments include identifying another video frame of the target video as the "current video frame" (Operation 526). The user device identifies another video frame of the target video as the "current video frame." The user device iterates Operations 508-526 with the current video frame.

Figure 6:
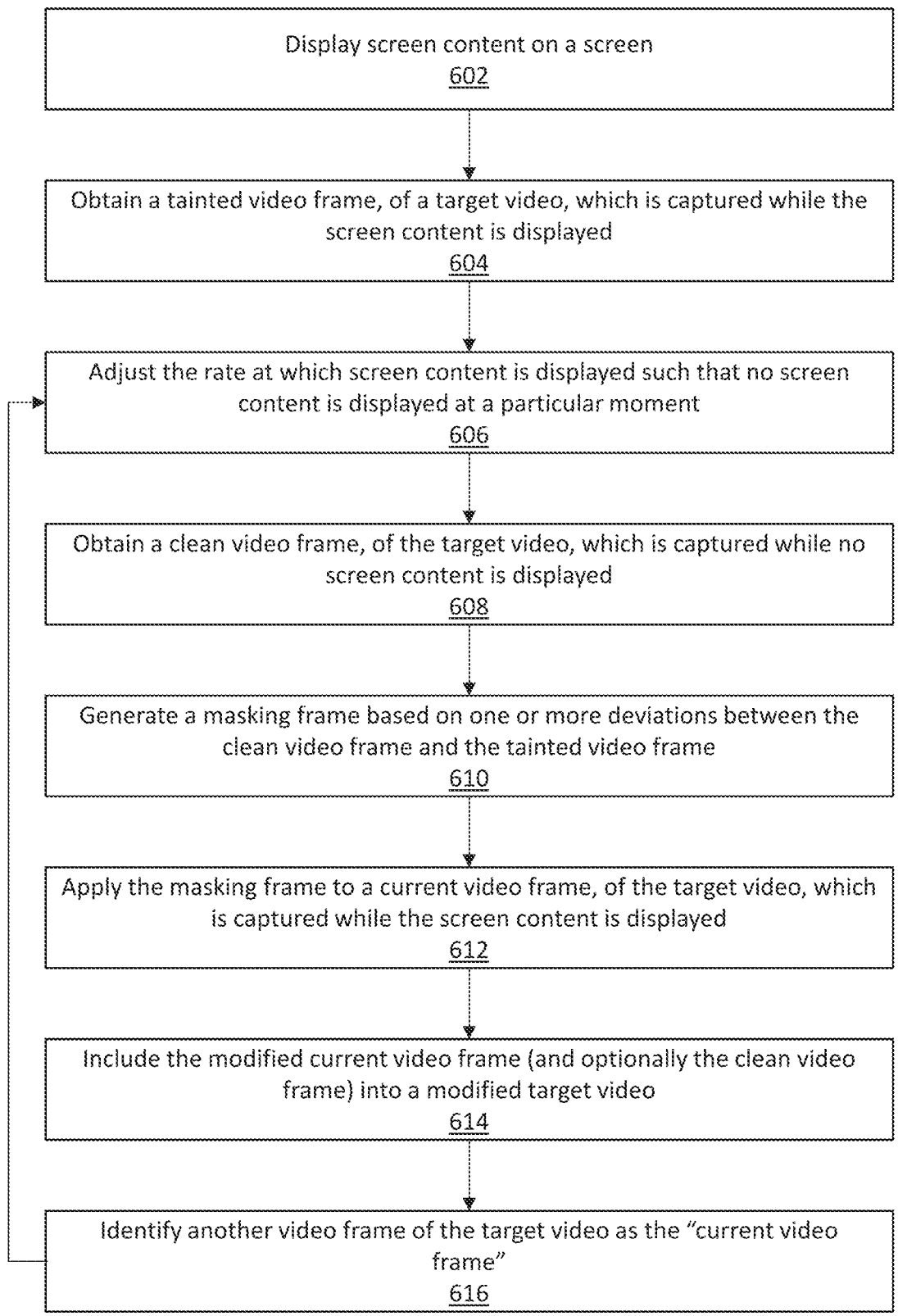
FIG. 6 illustrates an example set of operations for removing, from a video, visual content representing a reflection of display content on a screen, by altering a rate at which screen content is displayed to generate a masking frame, in accordance with one or more embodiments.

FIG. 6 illustrates an example set of operations for removing, from a video, visual content representing a reflection of display content on a screen, by altering a rate at which screen content is displayed to generate a masking frame, in accordance with one or more embodiments.

One or more embodiments include displaying screen content on a screen (Operation 602). A screen (such as screen 104 of FIG. 1) of a user device displays a current screen content. The current screen content shows one or more user interfaces of applications executing on the user device. The user interfaces deliver information from the applications being executed on the user device to the user and/or receive information from the user for the application.

One or more embodiments include obtaining a tainted video frame of a target video (Operation 604). The term "tainted video frame" refers to a video frame captured while screen content is being displayed on a screen. A video frame may be determined as a tainted video frame merely based on the fact that the video frame was captured at a time that screen content was being displayed on the screen. As an example, a video frame that was captured at a time that screen content was being displayed on the screen may be tagged with metadata indicating that the video frame is tainted. Additionally or alternatively, a video frame may be determined as a tainted video frame based on determining whether the video frame includes any visual content representing a reflection of screen content, as described above with reference to Operation 508.

One or more embodiments include adjusting the rate at which the screen content is displayed such that no screen content is displayed at a particular moment (Operation 606). The user device may insert black frames or empty frames between the video frames corresponding to the screen content. Video frames corresponding to the screen content may be referred to as "screen content frames." Screen content frames deliver information from applications running on the user device to the user. As an example, a user device may intersperse one black frame for every five video frames of screen content. Hence, the video frames displayed by the screen may include: Black frame, screen content frame, screen content frame, screen content frame, screen content frame, screen content frame, black frame, screen content frame, screen content frame, screen content frame, screen content frame, screen content frame, and so on. The black frames may be but is not necessarily inserted at a rate that is imperceptible to a human being.

In an embodiment, the black frame replaces the screen content frame that would have been displayed on the screen but for the insertion of the black frame. As an example, without insertion of black frames, an application may transmit information to a user interface to be displayed. The user interface may render the following frames on a screen: Screen Content Frame 1, Screen Content Frame 2, Screen Content Frame 3. However, with insertion of black frames, a black frame may replace a screen content frame that would be have been displayed. For example, the user interface may render: Screen Content Frame 1, Black Frame, Screen Content Frame 3. Therefore, Screen Content Frame 2 is skipped and not displayed on the screen. In another embodiment, screen content frames before and after the insertion spot of a black frame may be modified to accommodate the insertion. As an example, a user may move a mouse across a screen at a particular speed. Without insertion of black frames, a user interface may render the following frames on a screen, showing the continuous mouse movement: Screen Content Frame 1, Screen Content Frame 2, Screen Content Frame 3. With an insertion of a black frame, Screen Content Frame 2 may be skipped. A modified version of Screen Content Frame 1 may show the mouse at a location between (a) a location of the mouse in the original version of Screen Content Frame 1 and (b) Screen Content Frame 2. A modified version of Screen Content Frame 3 may show the mouse at a location between (a) a location of the mouse in the original version of Screen Content Frame 3 and (b) Screen Content Frame 2. Hence, even though Screen Content Frame 2 is skipped, the motion of the mouse across the screen may be smoothed.

In an embodiment, the user device inserts a continuous duration of black frames once. As an example, a user device may insert black frames for a total duration of 0.6 seconds, and then continue with the frames of the screen content.

In an embodiment, the user device inserts one or more black frames responsive to detecting visual content representing a reflection of screen content in previous video frames captured by the sensor associated with the user device. The user device refrains from inserting black frames if no screen reflection is detected within captured video frames from the sensor within a threshold time period.

One or more embodiments include obtaining a clean video frame of the target video (Operation 608). The term "clean video frame" refers to a video frame captured while no screen content is being displayed on a screen. A video frame may be determined as a clean video frame merely based on the fact that the video frame was captured at a time that no screen content was being displayed on the screen. As an example, a video frame that was captured at a time that no screen content was being displayed on the screen may be tagged with metadata indicating that the video frame is clean. Additionally or alternatively, a video frame may be determined as a clean video frame based on determining whether the video frame includes any visual content representing a reflection of screen content, as described above with reference to Operation 508.

As an example, a user device may insert black frames for a 0.6-second time window at a particular time. The screen of the user device may display screen content, other than the 0.6-second time window. The screen of the user device may display black frames during the 0.6-second time window. The sensor coupled to the user device may capture video frames for a particular duration, including the 0.6-second time window when the screen displays black frames. The user device may mark the video frames captured during the 0.6-second time window as "clean video frames." The user device may mark other video frames captured outside of the 0.6-second time window as "tainted video frames."

One or more embodiments include generating a masking frame based on one or more deviations between the clean video frame and the tainted video frame (Operation 610). The user device identifies a tainted video frame and a clean video frame. As an example, a user device may identify a first clean video frame in a set of clean video frames, and a last tainted video frame before the first clean video frame. The user device subtracts the clean video frame from the tainted video frame. The subtraction is performed pixel by pixel. The user device generates a masking frame based on the difference between the clean video frame from the tainted video frame. As an example, a difference between the clean video frame from the tainted video frame may constitute a masking frame.

Optionally, the user device identifies multiple tainted video frames and multiple clean video frames. The user device may average, smooth, and/or otherwise aggregate the multiple tainted video frames to generate an aggregated tainted video frame. The user device may average, smooth, and/or otherwise aggregate the multiple clean video frames to generate an aggregated clean video frame. The user device may use the aggregated tainted video frame and the aggregated clean video frame to perform the subtraction process described above. The user device may subtract the aggregated clean video frame from the aggregated tainted video frame.

Optionally, the clean video frame is shifted with respect to the tainted video frame prior to the subtraction process. Additionally or alternatively, the clean video frame and/or the tainted video frame are resized, and/or tilted, prior to the subtraction process. The shift, resizing, and/or tilting determined based on any changes to the objects captured in the video frames and/or any movement of the sensor. As an example, a visual anchor may be detected at pixel (23, 40) in a clean video frame. The visual anchor may be detected at pixel (33, 40) in a tainted pixel frame. The clean video frame may be shifted to the right by 10 pixels prior to subtraction. Hence, pixel (23, 40) of the clean video frame would be subtracted from pixel (33, 40) of the tainted pixel frame.

Optionally, the subtraction process is performed with blurring, averaging, thresholding, and/or other smoothing techniques. In an embodiment, after obtaining a difference frame using the subtraction process, the user device applies a threshold RGB level to the difference frame. Any pixel within the difference frame that is below a threshold RBG level is converted into zero (that is, completely dark). Any pixel within the difference frame that is above the threshold RBG level is left unchanged. The user device generates a masking frame including the unchanged pixels of the difference frame, and the dark pixels that have been converted from the difference frame.

Optionally, the subtraction process is performed with a cleaning function. In an embodiment, a cleaning function includes identifying a location of a user's eyes within the clean video frame (and/or the tainted video frame), drawing circular shapes around the detected eyes, mapping the circular shapes from the clean video frame to the same position on the masking frame, and converting pixels of the masking frame that are outside of the circular shapes to having an RGB level of zero (that is, completely dark). In an alternative embodiment, lens of a pair of eyeglasses may be used instead of a user's eye. a cleaning function includes identifying a location of the lens of a pair of eyeglasses within the clean video frame (and/or the tainted video frame), mapping the region corresponding to the lens from the clean video frame to the same region on the masking frame, and converting pixels of the masking frame that are outside of the region to having an RGB level of zero (that is, completely dark). Additional and/or alternative cleaning functions may be used.

One or more embodiments include applying the masking frame to a current video frame of the target video (Operation 612). The current video frame may be a tainted video frame. The user device subtracts the masking frame from the current video frame. After applying the masking frame to the current video frame, a modified current video frame is generated.

Optionally, the user device may use operation similar to the operations of FIGS. 5A-5B to adjust the size, tilt, and/or position of the masking frame, prior to applying the masking frame.

In an embodiment, the user device determines a height of a user's eye in a clean video frame. The user device determines a height of the user's eye in a current video frame. The user device determines a factor difference between the two heights. The user device applies the same factor difference to the masking frame. The resized masking frame is then applied to the current video frame. As an example, a user's eye may be 0.021 inches tall in a clean video frame, and 0.20 inches tall in a current video frame. Hence, the height of the user's eye in the current video frame is 0.95 (0.20/0.21) times the height of the user's eye in the clean video frame. The user device may resize the masking frame by 0.95 times. The user device may add dark pixels to the perimeter of the masking frames to fill any empty areas after downsizing (this would not be necessary in upsizing). In alternative embodiments, the user device may use the distance between visual anchors and/or other visual attributes, to determine resizing factors.

Similarly, the user device may use visual anchors and/or other visual attributes to determine tilting and/or positioning adjustments for the masking frame. As an example, the user device determines a position of a user's eye in a clean video frame. The user device determines a position of the user's eye in a current video frame. The user device determines a difference between the two positions. The user device shifts the masking frame by the difference. The repositioned masking frame is then applied to the current video frame. As an example, a user's eye may be centered at pixel (23, 45) in a clean video frame, and (25, 45) in a current video frame. Hence, the user's eye has shifted horizontally, 2 pixels to the right. The user device may shift the masking frame in the opposite direction, by 2 pixels. The user device may add dark pixels to the perimeter of the masking frames to fill any empty areas after repositioning. In alternative embodiments, the user device may use the position of a visual anchor and/or other visual attribute, to determine repositioning magnitude and direction.

One or more embodiments include including the modified current video frame into a modified target video (Operation 614). The user device includes the modified current video frame into a modified target video. Optionally, the clean video frame obtained at Operation 608 is also included into the modified target video. The user device may display, store, and/or transmit the modified target video.

One or more embodiments include identifying another video frame of the target video as the "current video frame" (Operation 616). The process is reiterated with respect to the new current video frame. A new clean video frame may be used to update a masking frame. Alternatively, the same masking frame may be applied to multiple tainted video frames of the target video. Reusing the same masking frame reduces the frequency of the user device displaying black frames on the screen, thereby reducing the likelihood of the user noticing the black frames on the screen.

5. Removing Visual Content Representing a Screen Reflection by Generating Replacement Visual Content One or more operations illustrated in FIGS. 7-9 may be modified, rearranged, or omitted all together. Accordingly, the particular sequence of operations illustrated in FIGS. 7-9 should not be construed as limiting the scope of one or more embodiments. Operations of FIGS. 7-9 may be executed by a source user device (such as user device 102 of FIG. 1, or user device 302 of FIGS. 3A-3C), a recipient user device (such as user device 308 of FIGS. 3B-3C), a central server (such as central server 310 of FIG. 3C), and/or any other application communicatively coupled to the source user device. For purposes of clarify, the operations are described below as being performed by a user device, which may refer to a source user device and/or a recipient user device.

Figure 7:
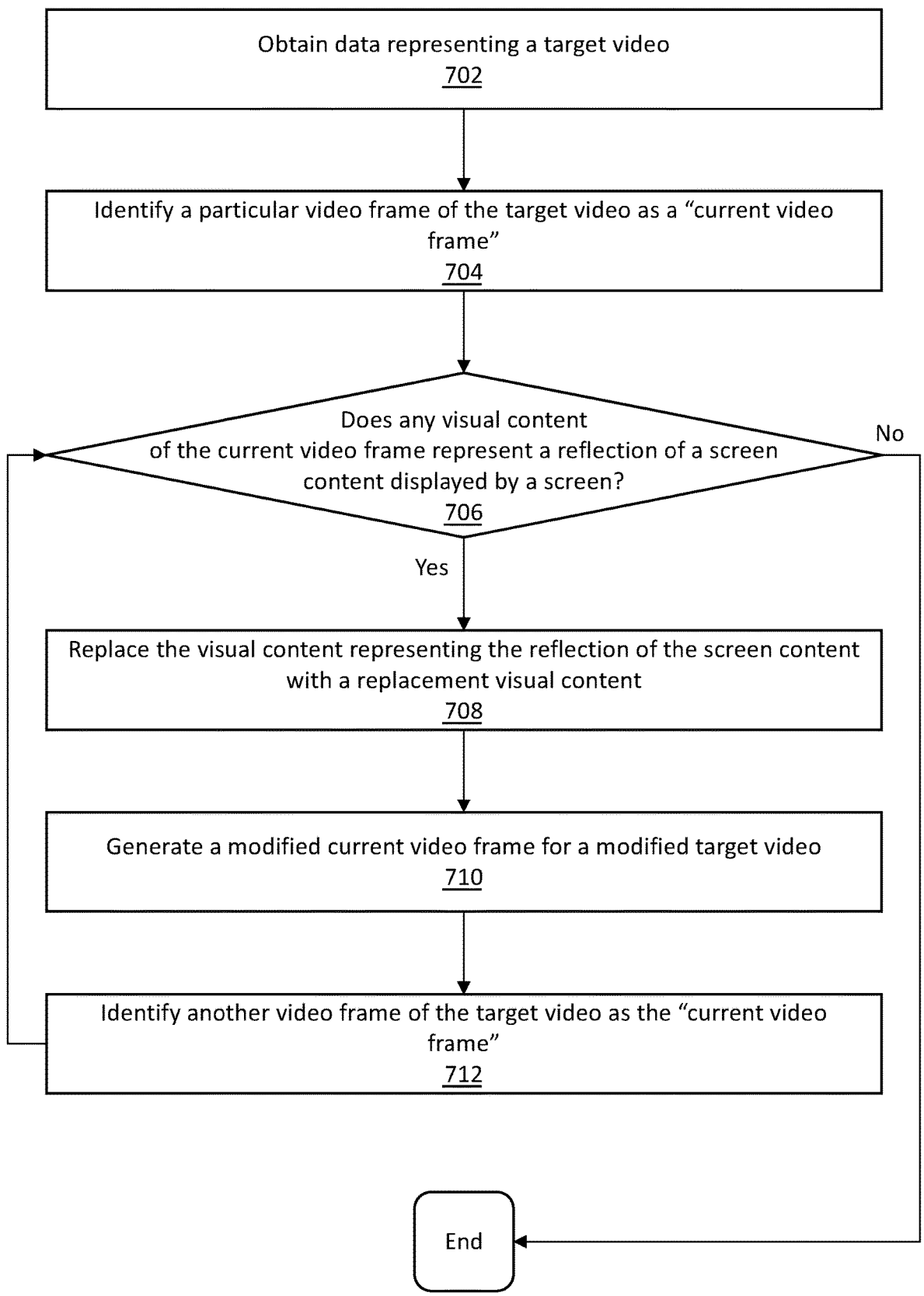
FIG. 7 illustrates an example set of operations for removing, from a video, visual content representing a reflection of display content on a screen, by detecting the visual content representing the reflection and generating a replacement visual content, in accordance with one or more embodiments.
Figure 8A:
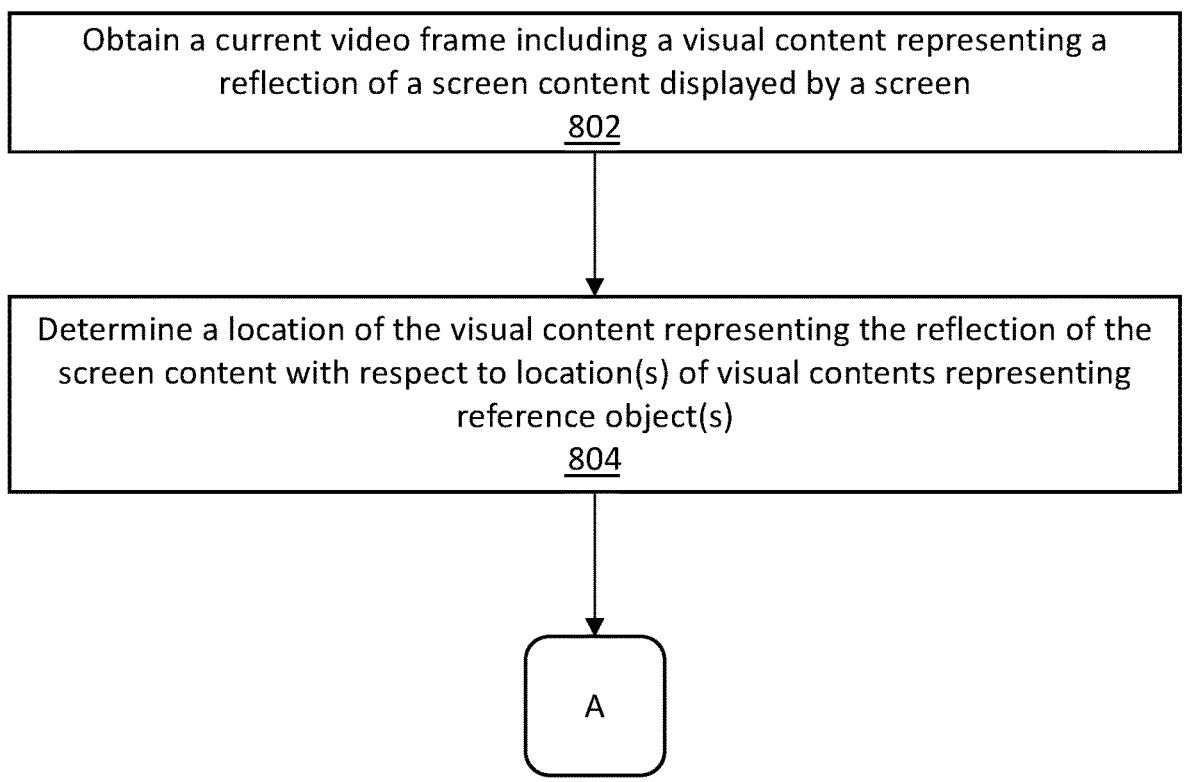
FIGS. 8A-B illustrates an example set of operations for generating a replacement visual content to replace visual content in a current video frame of a target video using one or more reference video frames in the target video, in accordance with one or more embodiments.
Figure 8B:
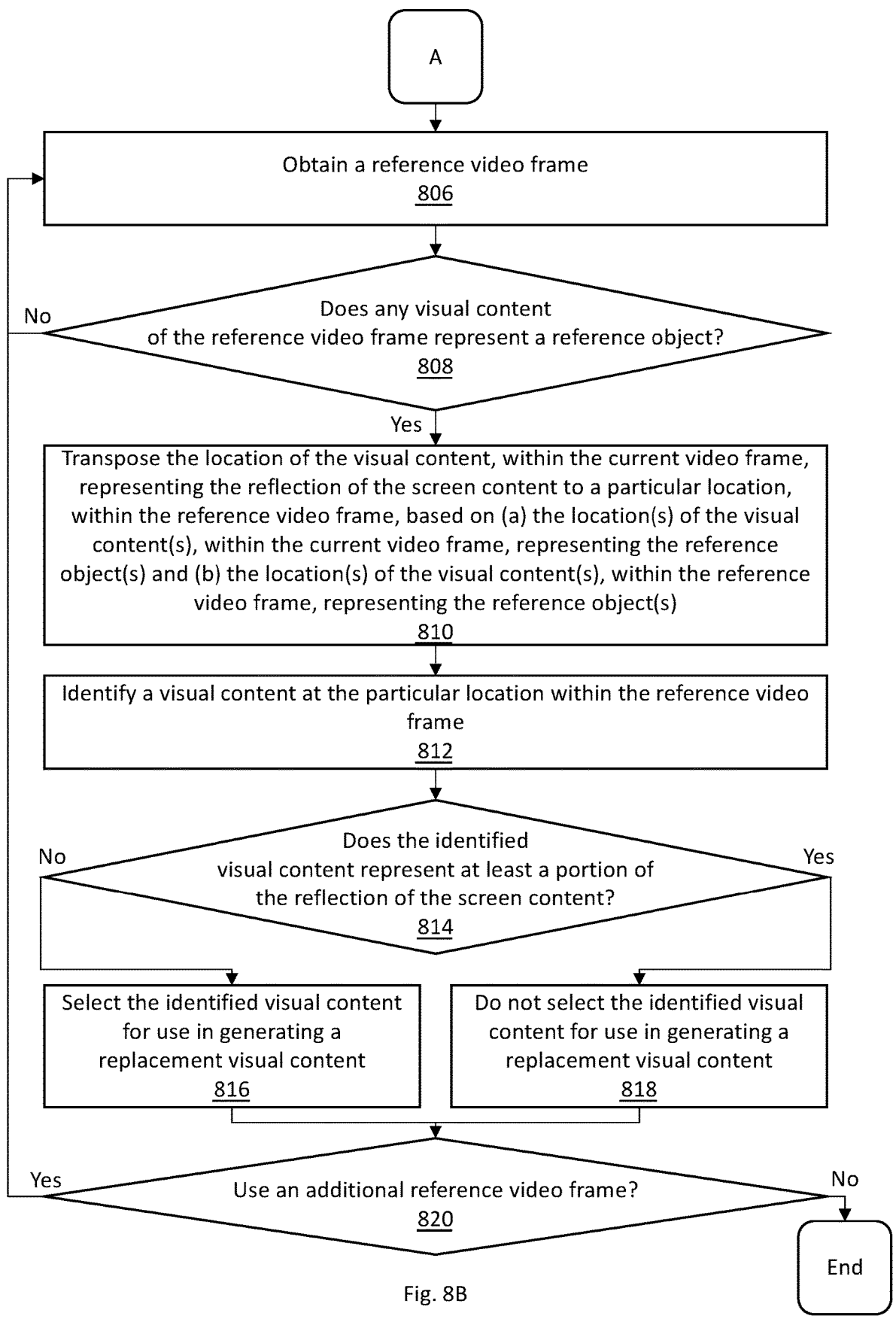

FIG. 7 illustrates an example set of operations for removing, from a video, visual content representing a reflection of display content on a screen, by detecting the visual content representing the reflection and generating a replacement visual content, in accordance with one or more embodiments.

One or more embodiments include obtaining data representing a target video (Operation 702). Examples of operations for obtaining data representing a target video are described above with reference to Operation 402 of FIG. 4.

One or more embodiments include identifying a particular video frame of the target video as a "current video frame" (Operation 704). The user device identifies a particular video frame of the target video as a "current video frame."

One or more embodiments include determining whether any visual content of the current video frame represent at least a portion of a reflection of a screen content displayed by a screen (Operation 706). Examples of operations for determining whether any visual content represents a reflection of screen content are described above with reference to Operation 508 of FIGS. 5A-5B.

One or more embodiments include replacing the visual content representing the reflection of the screen content with a replacement visual content (Operation 708). Examples of operations for generating a replacement visual content are described below with reference to FIGS. 8-9.

One or more embodiments include generating a modified current video frame for a modified target video (Operation 710). The user device generates a modified current video frame by overlaying the replacement visual content on the visual content representing the reflection of the screen content in the current video frame. Alternatively, the user device generates a modified current video frame by replacing the visual content representing the reflection of the screen content in the current video frame with the replacement content. The user device includes the modified current video frame into a modified target video.

One or more embodiments include identifying another video frame of the target video as the "current video frame" (Operation 712). The process is reiterated with respect to the new current video frame.

FIG. 8 illustrates an example set of operations for generating a replacement visual content to replace visual content in a current video frame of a target video using one or more reference video frames in the target video, in accordance with one or more embodiments.

One or more embodiments include obtaining a current video frame including a visual content representing a reflection of a screen content displayed by a screen (Operation 802). A user device obtains a current video frame including a visual content representing a reflection of screen content.

One or more embodiments include determining a location of the visual content representing the reflection of the screen content with respect to location(s) of visual contents representing reference object(s) (Operation 804). The user device determines a location of the visual content representing the reflection of the screen content with respect to locations of visual contents representing one or more reference objects, as shown in the current video frame.

One or more embodiments include obtaining a reference video frame (Operation 806). The user device obtains a reference video frame. The reference video frame may be captured using the same sensor that captured the current video frame. Alternatively, the reference video frame may be captured using a different sensor from the sensor that captured the current video frame. The additional sensor may be placed at a different location from the sensor that captured the current video frame, such that the additional sensor captures the same objects from a different angle.

One or more embodiments include determining whether any visual content of the reference video frame represents a reference object (Operation 808). The user device determines whether any visual content of the reference video frame represents one or more reference objects.

One or more embodiments include transposing the location of the visual content, within the current video frame, representing the reflection of the screen content to a particular location, within the reference video frame, based on (a) the location(s) of the visual content(s), within the current video frame, representing the reference object(s) and (b) the location(s) of the visual content(s), within the reference video frame, representing the reference object(s) (Operation 810). The user device determines the locations of the visual contents, within the current video frame, representing the reference objects. The user device determines the locations of the visual contents, within the reference video frame, representing the reference objects. The user device determines the location of the visual content, within the current video frame, representing the reflection of the screen content. The user device determines a distance between the location of the visual content, within the current video frame, representing the reflection of the screen content and the locations of the visual contents, within the current video frame, representing the reference objects. The user device identifies a point, within the reference video frame, having the same distances from the locations of the visual contents, within the reference video frame, representing the reference objects. The location of the reflection of the screen content within the current video frame is thereby transposed to the identified point within the reference video frame.

Optionally, the user device determines a resizing, tilt, and/or positioning adjustment between the current video frame and the reference video frame. The user device applies the adjustment in transposing the location of the reflection of the screen content. As an example, in a current video frame, a reflection of a screen content may be located at (23, 45). A soccer ball, serving as a reference object, may be located at (33, 45). Meanwhile, in a reference video frame, the soccer ball may be located at (33, 39). With no adjustment, the user device may determine that, within the current video frame, the reflection is located 10 pixels to the right of the soccer ball. The user device may identify a point that is 10 pixels to the right of the soccer ball within the reference video frame, that is, (23, 39). The user device may identify the location (23, 39) within the reference video frame as the transposed location of the reflection. However, the user device may determine that the soccer ball in the current video frame is 2% larger than the soccer ball in the reference video frame. Hence, the user device may determine a difference between the reflection and the soccer ball in the current video frame (that is, 10 pixels), and resize the difference by 2% (that is, becoming 8 pixels). The user device may identify a point that is 8 pixels to the right of the soccer ball within the reference video frame. The user device may identify the location (25, 39) within the reference video frame as the transposed location of the reflection.

One or more embodiments include identifying a visual content at the particular location within the reference video frame (Operation 812). The user device identifies a visual content at the particular location within the reference video frame.

As an example, a visual content at the particular location within the reference video frame may be a user's skin (surrounding the user's eye) that is slightly darkened by the user's glasses. The user device may identify the visual content.

One or more embodiments include determining whether the identified visual content represents at least a portion of the reflection of the screen content (Operation 814). Examples of operations for determining whether any visual content represents a reflection of screen content are described above with reference to Operation 508 of FIG. 5.

If the identified visual content does not represent any portion of the reflection of the screen content, one or more embodiments include selecting the identified visual content for use in generating a replacement visual content (Operation 816). The user device selects the identified visual content for use in generating a replacement visual content.

If the identified visual content represents at least a portion of the reflection of the screen content, one or more embodiments include not selecting the identified visual content for use in generating a replacement visual content (Operation 818). The user device does not select the identified visual content for use in generating a replacement visual content.

One or more embodiments include determining whether to use an additional reference video frame (Operation 820). The process reiterates with respect to the additional reference video frame.

Selected visual contents for use in generating the replacement visual content are compiled. An aggregation function may be applied to the selected visual contents to generate the replacement visual content. As an example, the selected visual contents may be averaged, pixel by pixel, to generate the replacement visual content.

In one or more embodiments, the rate ("screen rate") at which screen content is displayed and the rate ("capture rate") at which the sensor captures frames of the target video may be coordinated. The screen rate is adjusted such that no screen content is displayed on the screen at a particular moment. A particular video frame is captured by the sensor while no screen content is displayed. Hence, the particular video frame is known not to include any reflection of screen content. The particular video frame is used as a "reference video frame" within FIGS. 8A-B. Visual content, within the particular video frame, corresponding to the area of the reflection of screen content in the current video frame is identified. The identified visual content is selected for use in generating the replacement visual content.

As an example, a black frame may be inserted between frames of screen content, which alters the rate at which screen content is displayed. A sensor may capture a video frame while the black frame is displayed. The video frame may be used as a "reference video frame." Visual content, within the reference video frame, corresponding to the area of the screen reflection in the current video frame is identified. The identified visual content is selected for use in generating replacement visual content.

Figure 9:
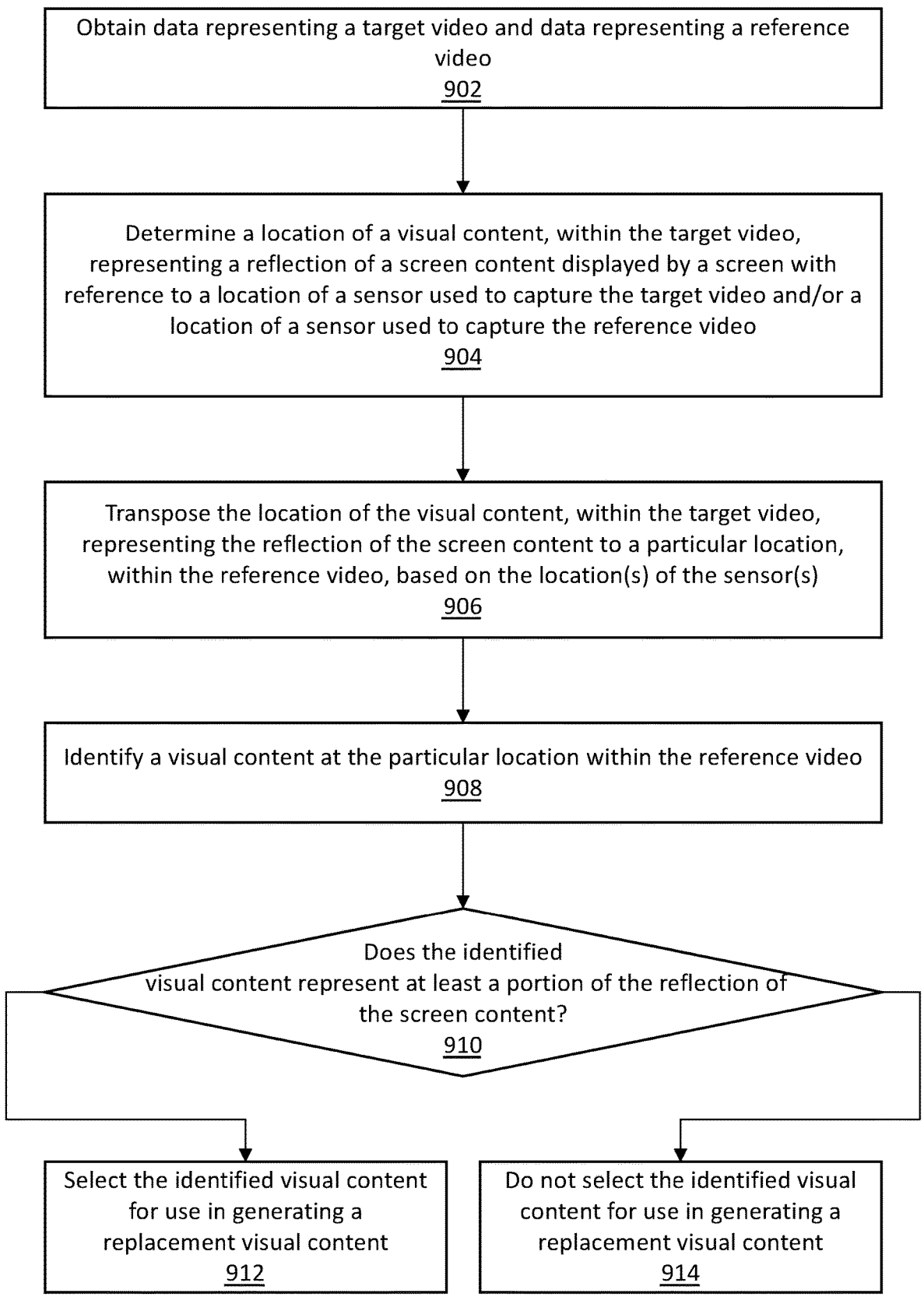
FIG. 9 illustrates an example set of operations for generating a replacement visual content to replace visual content in a target video using a reference video captured by a different sensor, in accordance with one or more embodiments.

FIG. 9 illustrates an example set of operations for generating a replacement visual content to replace visual content in a target video using a reference video captured by a different sensor, in accordance with one or more embodiments.

One or more embodiments include obtaining data representing a target video and data representing a reference video (Operation 902). A target sensor (such as sensor 108 of FIG. 1) captures frames of a target video. A reference sensor captures frames of a reference video. A user device obtains the target video from the target sensor and the reference video from the reference sensor.

One or more embodiments include determining a location of a visual content, within the target video, representing a reflection of a screen content with reference to a location of the target sensor and/or a location of the reference sensor (Operation 904). The user device determines a location of a visual content, within the target video, representing a reflection of a screen content with reference to a location of the target sensor and/or a location of the reference sensor.

One or more embodiments include transposing the location of the visual content, within the target video, representing the reflection of the screen content to a particular location, within the reference video, based on the location(s) of the sensor(s) (Operation 906). The user device transposes the location of the visual content, within the target video, representing the reflection of the screen content to a particular location, within the reference video, based on the location(s) of the sensor(s).

One or more embodiments include identifying a visual content at the particular location within the reference video (Operation 908). Examples of operations for identifying a visual content at the particular location within the reference video are described above with reference to Operation 812 of FIG. 8.

One or more embodiments include determining whether the identified visual content represents at least a portion of the reflection of the screen content (Operation 910). Examples of operations for determining whether any visual content represents a reflection of screen content are described above with reference to Operation 508 of FIG. 5.

If the identified visual content does not represent any portion of the reflection of the screen content, one or more embodiments include selecting the identified visual content for use in generating a replacement visual content (Operation 912). The user device selects the identified visual content for use in generating a replacement visual content.

If the identified visual content represents at least a portion of the reflection of the screen content, one or more embodiments include not selecting the identified visual content for use in generating a replacement visual content (Operation 914). The user device does not select the identified visual content for use in generating a replacement visual content.

In one or more embodiments, the operations of FIGS. 8-9 may be combined to select visual content from reference video frames, within the same target video and/or within one or more reference videos, for generating the replacement visual content.

6. Removing Visual Content Representing a Screen Reflection by Removing Tainted Video Frames One or more operations illustrated in FIG. 10 may be modified, rearranged, or omitted all together. Accordingly, the particular sequence of operations illustrated in FIG. 10 should not be construed as limiting the scope of one or more embodiments.

Figure 10:
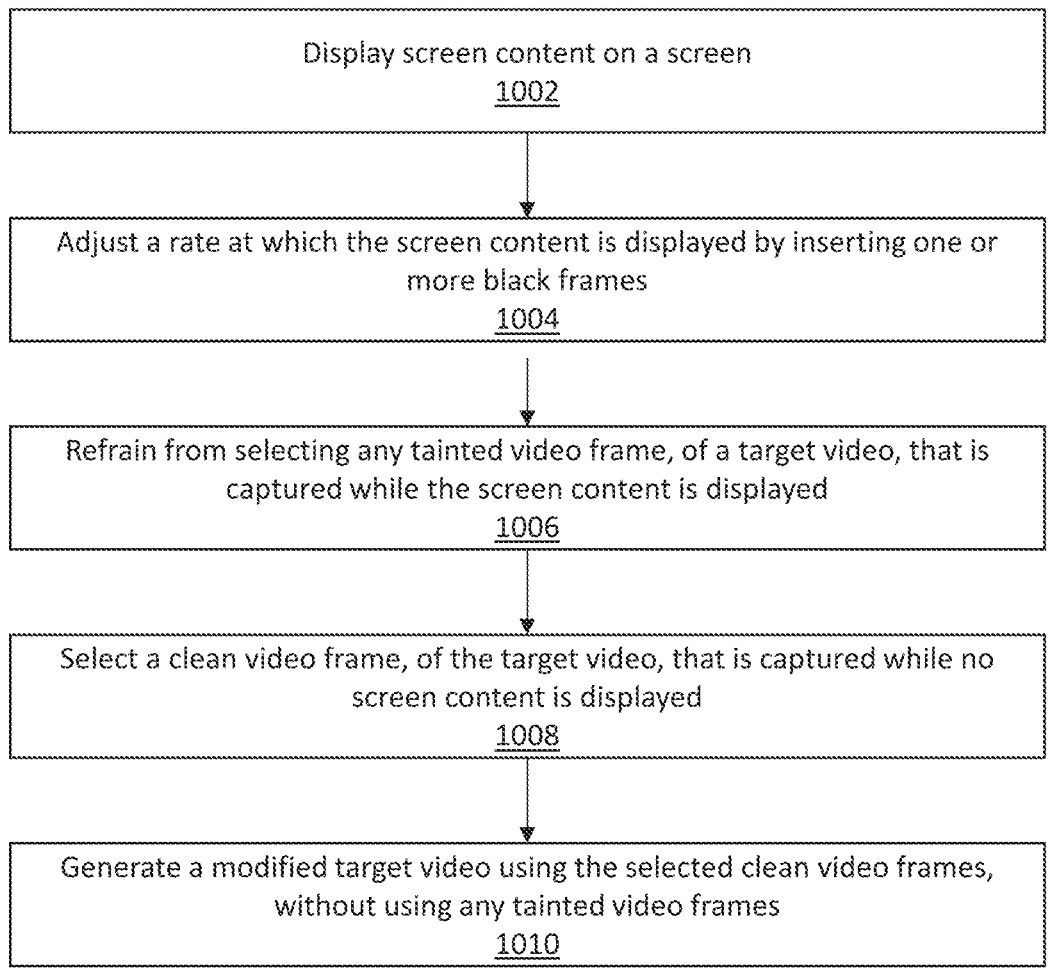
FIG. 10 illustrates an example set of operations for removing, from a video, visual content representing a reflection of display content on a screen, by removing tainted video frames, in accordance with one or more embodiments.

FIG. 10 illustrates an example set of operations for removing, from a video, visual content representing a reflection of display content on a screen, by removing tainted video frames, in accordance with one or more embodiments.

One or more embodiments include displaying screen content on a screen (Operation 1002). Examples of operations for displaying screen content are described above with reference to Operation 502 of FIG. 5.

One or more embodiments include adjusting a rate at which the screen content is displayed by inserting black frames (Operation 1004). The user device inserts black frames between frames of screen content at a particular rate.

One or more embodiments include refraining from selecting any tainted video frame, of a target video, that is captured while the screen content is displayed (Operation 1006).

In an embodiment, a sensor captures a target video without regard to the rate at which screen content is displayed. A user device obtains the target video from the sensor. The user device determines the particular times at which frames of screen content were displayed. The user device corresponds the particular times to particular frames within the target video. The user device determines that the particular frames are tainted frames. The user device refrains from selecting the tainted frames.

In another embodiment, the user device adjusts the capture rate of the sensor for capturing the target video such that the sensor does not capture any video frames while the screen content is displayed. Hence, the target video as captured does not include any tainted frames. As an example, a user device may insert a black frame into every 4 frames of screen content. Hence, the frames displayed may be as follows: Black Frame, Screen Content Frame, Screen Content Frame, Screen Content Frame, Screen Content Frame, Black Frame, Screen Content Frame, Screen Content Frame, Screen Content Frame, Screen Content Frame. A sensor capturing a target video may capture frames when black frames are displayed. Hence, the sensor may capture and refrain from capturing frames as follows: Capture, Refrain, Refrain, Refrain, Capture, Refrain, Refrain, Refrain. The sensor's "Capture" corresponds to the screen displaying a "Black Frame," while the sensor's "Refrain" corresponds to the screen displaying a "Screen Content Frame."

One or more embodiments include selecting a clean video frame, of the target video, that is captured while no screen content is displayed (Operation 1008).

In an embodiment, the user device determines the particular times at which black frames were displayed. The user device corresponds the particular times to particular frames within the target video. The user device determines that the particular frames are clean frames. The user device selects the clean frames.

In another embodiment, the target video as captured includes no tainted frames. The user device selects one or more frames of the target video.

One or more embodiments include generating a modified target video using the selected clean video frames, without using any tainted video frames (Operation 1010). The user device generates a modified target video using the selected clean video frames, without using any tainted video frames.

7. Removing Visual Content Representing a Screen Reflection by Manipulating Polarization One or more operations illustrated in FIG. 11 may be modified, rearranged, or omitted all together. Accordingly, the particular sequence of operations illustrated in FIG. 11 should not be construed as limiting the scope of one or more embodiments.

Figure 11:
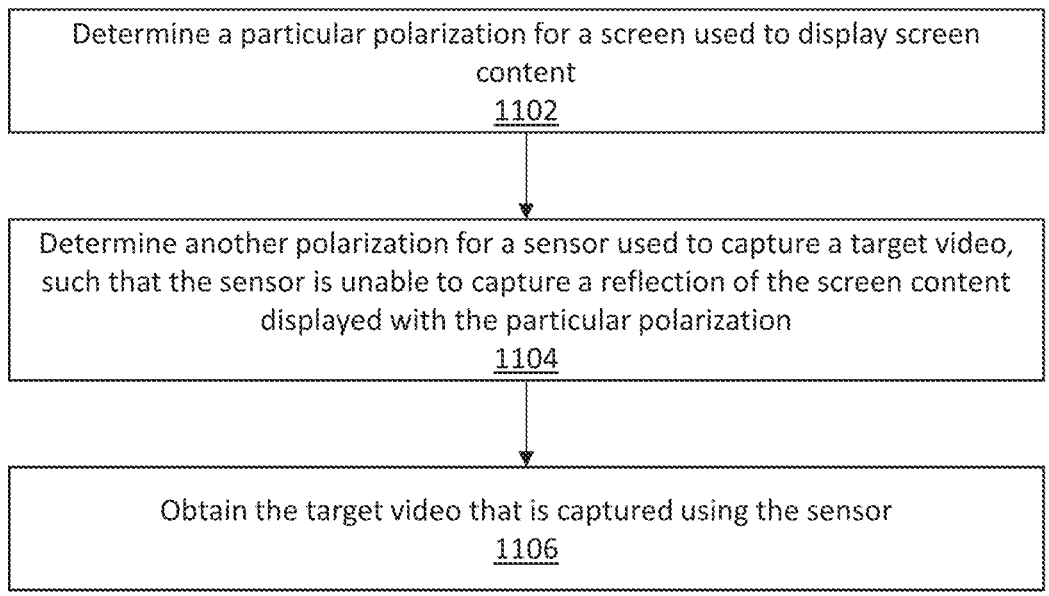
FIG. 11 illustrates an example set of operations for removing, from a video, visual content representing a reflection of display content on a screen, by manipulating polarizations, in accordance with one or more embodiments.

FIG. 11 illustrates an example set of operations for removing, from a video, visual content representing a reflection of display content on a screen, by manipulating polarizations, in accordance with one or more embodiments.

One or more embodiments include determining a particular polarization for a screen used to display screen content (Operation 1102). A user device determines a particular polarization for a screen. The user device sets the screen to use the particular polarization. The screen displays screen content using the particular polarization, wherein the screen content includes information provided by an application for a user. Any changes to the polarization of the screen may be but is not necessarily imperceptible to a human being.

One or more embodiments include determining another polarization for a sensor used to capture a target video, such that the sensor is unable to capture a reflection of the screen content displayed with the particular polarization (Operation 1104). The user device determines another polarization for a sensor used to capture a target video. The sensor's polarization is set such that the sensor cannot capture a reflection of the screen content displayed at the particular polarization, assuming the reflection is created by a perfect mirror reflecting all light. In some instances, due to the imperfections of eyeglasses lens and/or other environmental factors, the sensor may still capture small portions of the reflection of the screen content displayed at the particular polarization.

In an embodiment, the polarization adjustment is performed responsive to determining that a video conference has begun. In another embodiment, the polarization adjustment is performed responsive to determining that a user wearing glasses is captured in a target video. In another embodiment, the polarization adjustment is performed responsive to determining that visual content, within the target video, represents a reflection of screen content.

One or more embodiments include obtaining the target video that is captured using the sensor (Operation 1106). The user device obtains the target video that is captured using the sensor. Due to the polarizations specifically determined at Operations 1102-1104, the captured target video does not include the reflection of the screen content. Assuming a perfect mirror creating the reflection of the screen content, the captured target video does not include the reflection of the screen content. In some instances, due to the imperfections of eyeglasses lens and/or other environmental factors, the sensor may still include small portions of the reflection of the screen content.

Additionally or alternatively, polarizations may be used to produce clean video frames in a target video. The polarizations of the screen and the sensor may be coordinated to mismatch (such that the sensor cannot capture screen reflections) at a certain rate. Video frames captured during a mismatch are thereby "clean." The clean video frames may be used for generating a masking frame (for example, using operations similar to FIG. 6 above). The clean video frames may be used as reference video frames for generating replacement visual content (for example, using operations similar to FIGS. 8-9).

8. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other.

9. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 12 is a block diagram that illustrates a computer system 1200 upon which an embodiment of the invention may be implemented. Computer system 1200 includes a bus 1202 or other communication mechanism for communicating information, and a hardware processor 1204 coupled with bus 1202 for processing information. Hardware processor 1204 may be, for example, a general purpose microprocessor.

Computer system 1200 also includes a main memory 1206, such as a random access memory (RAM) or other dynamic storage device, coupled to bus 1202 for storing information and instructions to be executed by processor 1204. Main memory 1206 also may be used for storing temporary variables or other intermediate information during execution of instructions to be executed by processor 1204. Such instructions, when stored in non-transitory storage media accessible to processor 1204, render computer system 1200 into a special-purpose machine that is customized to perform the operations specified in the instructions.

Computer system 1200 further includes a read only memory (ROM) 1208 or other static storage device coupled to bus 1202 for storing static information and instructions for processor 1204. A storage device 1210, such as a magnetic disk or optical disk, is provided and coupled to bus 1202 for storing information and instructions.

Computer system 1200 may be coupled via bus 1202 to a display 1212, such as a cathode ray tube (CRT), for displaying information to a computer user. An input device 1214, including alphanumeric and other keys, is coupled to bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

Computer system 1200 may implement the techniques described herein using customized hard-wired logic, one or more ASICs or FPGAs, firmware and/or program logic which in combination with the computer system causes or programs computer system 1200 to be a special-purpose machine. According to one embodiment, the techniques herein are performed by computer system 1200 in response to processor 1204 executing one or more sequences of one or more instructions contained in main memory 1206. Such instructions may be read into main memory 1206 from another storage medium, such as storage device 1210. Execution of the sequences of instructions contained in main memory 1206 causes processor 1204 to perform the process steps described herein. In alternative embodiments, hardwired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1210. Volatile media includes dynamic memory, such as main memory 1206. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 1202. Transmission media can also take the form of acoustic or light waves, such as those generated during radio-wave and infra-red data communications.

Various forms of media may be involved in carrying one or more sequences of one or more instructions to processor 1204 for execution. For example, the instructions may initially be carried on a magnetic disk or solid state drive of a remote computer. The remote computer can load the instructions into its dynamic memory and send the instructions over a telephone line using a modem. A modem local to computer system 1200 can receive the data on the telephone line and use an infra-red transmitter to convert the data to an infra-red signal. An infra-red detector can receive the data carried in the infra-red signal and appropriate circuitry can place the data on bus 1202. Bus 1202 carries the data to main memory 1206, from which processor 1204 retrieves and executes the instructions. The instructions received by main memory 1206 may optionally be stored on storage device 1210 either before or after execution by processor 1204.

Computer system 1200 also includes a communication interface 1218 coupled to bus 1202. Communication interface 1218 provides a two-way data communication coupling to a network link 1220 that is connected to a local network 1222. For example, communication interface 1218 may be an integrated services digital network (ISDN) card, cable modem, satellite modem, or a modem to provide a data communication connection to a corresponding type of telephone line. As another example, communication interface 1218 may be a local area network (LAN) card to provide a data communication connection to a compatible LAN. Wireless links may also be implemented. In any such implementation, communication interface 1218 sends and receives electrical, electromagnetic or optical signals that carry digital data streams representing various types of information.

Network link 1220 typically provides data communication through one or more networks to other data devices. For example, network link 1220 may provide a connection through local network 1222 to a host computer 1224 or to data equipment operated by an Internet Service Provider (ISP) 1226. ISP 1226 in turn provides data communication services through the world wide packet data communication network now commonly referred to as the "Internet" 1228. Local network 1222 and Internet 1228 both use electrical, electromagnetic or optical signals that carry digital data streams. The signals through the various networks and the signals on network link 1220 and through communication interface 1218, which carry the digital data to and from computer system 1200, are example forms of transmission media.

Computer system 1200 can send messages and receive data, including program code, through the network(s), network link 1220 and communication interface 1218. In the Internet example, a server 1230 might transmit a requested code for an application program through Internet 1228, ISP 1226, local network 1222 and communication interface 1218.

The received code may be executed by processor 1204 as it is received, and/or stored in storage device 1210, or other non-volatile storage for later execution.

10. MISCELLANEOUS; EXTENSIONS

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory machine-readable media storing instructions which, when executed by one or more processors, cause:
   displaying, on a screen, a first screen content frame during a first time period;
   displaying, on the screen, a black frame during a second time period;
   wherein the black frame is a video frame that is black or empty;
   obtaining a target video captured by a sensor, wherein the target video includes a first video frame and a second video frame;
   wherein the first video frame is captured during the first time period during which the first screen content frame is displayed on the screen and the first video frame includes visual content representing a reflection of the first screen content;
   wherein the second video frame is captured during the second time period during which the black frame is displayed on the screen;
   generating a masking frame based on the first video frame and the second video frame;

wherein generating the masking frame comprises:
  determining a clean video frame based on the second video frame;
  determining a tainted video frame based on the first video frame;
  generating the masking frame based at least on one or more deviations between the clean video frame and the tainted video frame;
applying the masking frame to a target video frame, within the target video, to generate a modified target video frame;
including the modified target video frame into a modified target video.

2. The one or more media of claim 1, wherein displaying, on the screen, the black frame during the second time period comprises inserting the black frame in between the first screen content frame and a second screen content frame.

3. The one or more media of claim 1, further storing instructions which cause:
  displaying a second screen content frame during a third time period, subsequent to the second time period;
  wherein displaying, on the screen, the black frame during the second time period comprises:
    identifying a third screen content frame, the third screen content frame comprising information provided by an application for display on the screen between the first screen content frame and the second screen content frame;
    replacing the third screen content frame with the black frame.

4. The one or more media of claim 1, further storing instructions which cause:
  identifying one or more original screen content frames, the original screen content frames comprising information provided by an application for display on the screen;
  responsive to determining that the black frame is to replace at least one of the original screen content frames: applying a smoothing function to the original screen content frames to generate the first screen content that is displayed on the screen.

5. The one or more media of claim 1, wherein the clean video frame is the second video frame, and the tainted video frame is the first video frame.

6. The one or more media of claim 1, wherein determining the clean video frame based on the second video frame comprises:
  determining that a third video frame is captured during a third time period during which the black frame is displayed on the screen;
  aggregating at least the second video frame and the third video frame to generate the clean video frame.

7. The one or more media of claim 1, wherein generating the masking frame based at least on the deviations between the clean video frame and the tainted video frame comprises:
  identifying a first pixel at a particular location within the clean video frame;
  identifying a second pixel at the particular location within the tainted video frame;
  subtracting a first brightness level of the first pixel from a second brightness level of the second pixel.

8. The one or more media of claim 1, wherein generating the masking frame based at least on the deviations between the clean video frame and the tainted video frame comprises:
  subtracting at least a first portion of the clean video frame from at least a second portion of the tainted video frame to generate a difference frame;
  identifying a subset of pixels of the difference frame having a brightness level below a threshold value;
  converting the subset of pixels to having a brightness level of zero.

9. The one or more media of claim 1, wherein generating the masking frame based at least on the deviations between the clean video frame and the tainted video frame comprises:
  subtracting at least a first portion of the clean video frame from at least a second portion of the tainted video frame to generate a difference frame;
  determining a region within the difference frame corresponding to at least one of: a first location of a user's eye in the clean video frame, and a second location of the user's eye in the tainted video frame;
  converting a subset of pixels of the difference frame that are outside of the region to having a brightness level of zero.

10. The one or more media of claim 1, wherein generating the masking frame based at least on the deviations between the clean video frame and the tainted video frame comprises:
  subtracting at least a first portion of the clean video frame from at least a second portion of the tainted video frame to generate a difference frame;
  determining a region within the difference frame corresponding to at least one of: eyeglasses lens captured in the clean video frame, and the eyeglasses lens captured in the tainted video frame;
  converting a subset of pixels of the difference frame that are outside of the region to having a brightness level of zero.

11. The one or more media of claim 1, wherein applying the masking frame to the target video frame to generate the modified target video frame comprises:
  subtracting the masking frame from the target video frame to generate the modified target video frame.

12. The one or more media of claim 11, wherein applying the masking frame to the target video frame to generate the modified target video frame further comprises:
  adjusting at least one of size, tilt, and position of the masking frame prior to subtracting the masking frame from the target video frame.

13. The one or more media of claim 1, further storing instructions which cause:
  causing the modified target video to be displayed on at least one of (a) the screen, and (b) a second screen.

14. The one or more media of claim 1, further storing instruction which cause:
  transmitting the modified target video to a user device for display on a second screen associated with the user device.

15. The one or more media of claim 1, wherein displaying the black frame during the second time period is responsive to detecting visual content representing a reflection of screen content in a video frame captured by the sensor prior to the second time period.

16. The one or more media of claim 1, further storing instructions comprising:
  including at least one of the second video frame and the clean video frame into the modified target video.

17. The one or more media of claim 1, wherein generating the masking frame is responsive to determining that the first video frame is captured during the first time period during which the first screen content frame is displayed on the screen and that the second video frame is captured during the second time period during which the black frame is displayed on the screen.

18. A method, comprising:
  displaying, on a screen, a first screen content frame during a first time period;
  displaying, on the screen, a black frame during a second time period;
    wherein the black frame is a video frame that is black or empty;
  obtaining a target video captured by a sensor, wherein the target video includes a first video frame and a second video frame;
  wherein the first video frame is captured during the first time period during which the first screen content frame is displayed on the screen and the first video frame includes visual content representing a reflection of the first screen content;
  wherein the second video frame is captured during the second time period during which the black frame is displayed on the screen;
  generating a masking frame based on the first video frame and the second video frame;
  wherein generating the masking frame comprises:
    determining a clean video frame based on the second video frame;
    determining a tainted video frame based on the first video frame;
    generating the masking frame based at least on one or more deviations between the clean video frame and the tainted video frame;
  applying the masking frame to a target video frame, within the target video, to generate a modified target video frame;
  including the modified target video frame into a modified target video;
  wherein the method is performed by one or more devices, each including one or more hardware processors.

19. One or more non-transitory machine-readable media storing instructions which, when executed by one or more processors, cause:
  setting a screen to display a first screen content frame using a first polarization;
  displaying, on the screen, the first screen content frame using the first polarization during a first time period;
  setting a sensor to capture a first video frame using a second polarization, such that the sensor is able to capture a reflection of the first screen content frame displayed using the first polarization;
  capturing, by the sensor, the first video frame using the second polarization during the first time period;
  setting the screen to display a second screen content frame using a third polarization;
  displaying, on the screen, the second screen content frame using the third polarization during a second time period;
  setting the sensor to capture a second video frame using a fourth polarization, such that the sensor is unable to capture a reflection of the second screen content frame displayed using the third polarization;
  capturing, by the sensor, the second video frame using the fourth polarization during the second time period;
  responsive at least to determining that the first video frame is captured during the first time period during which the sensor is able to capture the reflection of the first screen content frame and that the second video frame is captured during the second time period during which the sensor is unable to capture the reflection of the first screen content frame:
    generating a masking frame based on the first video frame and the second video frame;
  wherein generating the masking frame comprises:
    determining a clean video frame based on the second video frame;
    determining a tainted video frame based on the first video frame;
    generating the masking frame based at least on one or more deviations between the clean video frame and the tainted video frame;
  applying the masking frame to a target video frame, within the target video, to generate a modified target video frame;
  including the modified target video frame into a modified target video.

20. The one or more media of claim 19, wherein displaying the black frame during the second time period is responsive to detecting visual content representing a reflection of screen content in a video frame captured by the sensor prior to the second time period.

* * * * *